US010353282B2

(12) United States Patent
Yamamoto

(10) Patent No.: US 10,353,282 B2
(45) Date of Patent: Jul. 16, 2019

(54) PROJECTION DISPLAY APPARATUS THAT CALCULATES A DISTANCE TO A DISPLAY SURFACE

(71) Applicant: Panasonic Intellectual Property Management Co., Ltd., Osaka (JP)

(72) Inventor: Norikazu Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/013,979

(22) Filed: Jun. 21, 2018

(65) Prior Publication Data
US 2019/0018311 A1    Jan. 17, 2019

(30) Foreign Application Priority Data

Jul. 11, 2017    (JP) .................. 2017-135572

(51) Int. Cl.
*G03B 21/28* (2006.01)
*H04N 9/31* (2006.01)
(Continued)

(52) U.S. Cl.
CPC .............. *G03B 21/28* (2013.01); *G01S 17/10* (2013.01); *G02B 5/20* (2013.01); *H04N 9/312* (2013.01);
(Continued)

(58) Field of Classification Search
CPC ........ G03B 21/28; G02B 5/20; H04N 9/3105; H04N 9/312; H04N 9/3152
See application file for complete search history.

(56) References Cited

U.S. PATENT DOCUMENTS

2004/0252283 A1* 12/2004 Ogawa .................. G03B 21/00
                                                              353/69
2006/0098172 A1*  5/2006 Goto ..................... G03B 21/28
                                                              353/98
(Continued)

FOREIGN PATENT DOCUMENTS

JP         5-333151       12/1993
JP      2007-324643       12/2007
(Continued)

*Primary Examiner* — Sultan Chowdhury
*Assistant Examiner* — Magda Cruz
(74) *Attorney, Agent, or Firm* — Wenderoth, Lind & Ponack, L.L.P.

(57) ABSTRACT

The projection display apparatus includes a light source unit, a light deflector, a first light receiver, a second light receiver, and a calculator. The light deflector deflects at least part of incident light coming from the light source unit to a first optical path so as to produce a projection light, and deflects a remaining part of the incident light to a second optical path. The first light receiver receives the at least part of the incident light that has been reflected by the projection surface. The second light receiver receives the remaining part of the incident light. The calculator calculates a distance from the projection display apparatus to a projection surface based on light reception results obtained by the first light receiver receiving the at least part of the incident light and the second light receiver receiving the remaining part of the incident light.

17 Claims, 18 Drawing Sheets

(51) Int. Cl.
 *G02B 5/20* (2006.01)
 *G01S 17/10* (2006.01)
(52) U.S. Cl.
 CPC ......... *H04N 9/3105* (2013.01); *H04N 9/3152* (2013.01); *H04N 9/3158* (2013.01); *H04N 9/3185* (2013.01); *H04N 9/3194* (2013.01)

(56) References Cited

U.S. PATENT DOCUMENTS

2007/0216876 A1* 9/2007 Narikawa ............ H04N 9/3114
 353/84
2008/0036995 A1 2/2008 Inoue
2008/0239246 A1 10/2008 Yamamoto
2009/0073323 A1 3/2009 Inoue
2009/0161091 A1 6/2009 Yamamoto
2012/0224110 A1 9/2012 Kawamoto

FOREIGN PATENT DOCUMENTS

| | | |
|---|---|---|
| JP | 2008-046314 | 2/2008 |
| JP | 4692531 B | 6/2011 |
| JP | 2012-181296 | 9/2012 |
| JP | 5348449 B | 11/2013 |
| JP | 5504781 B | 5/2014 |

* cited by examiner

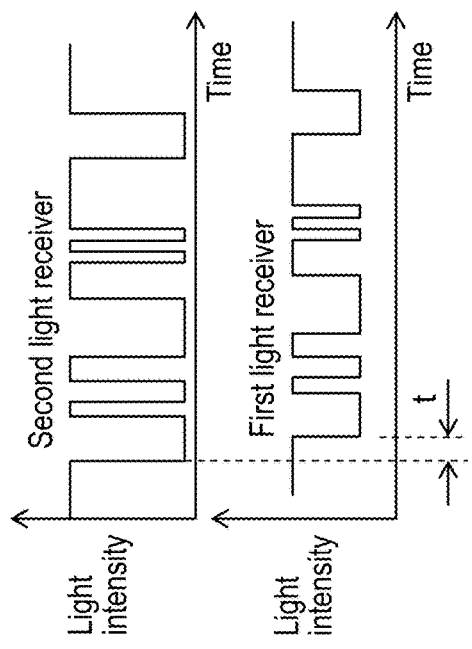
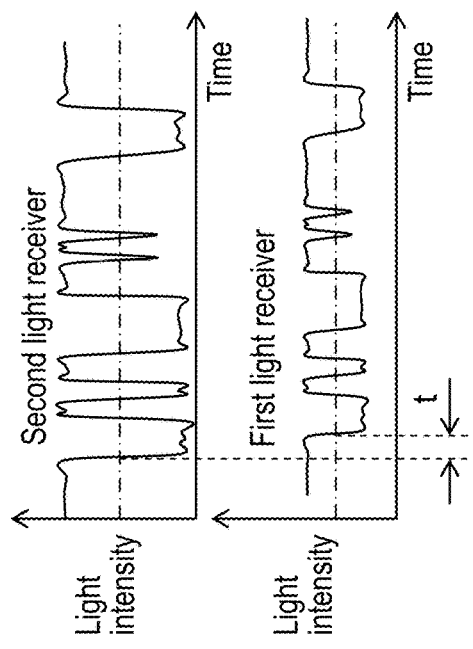
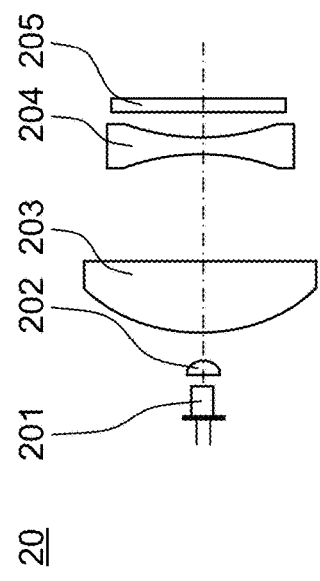
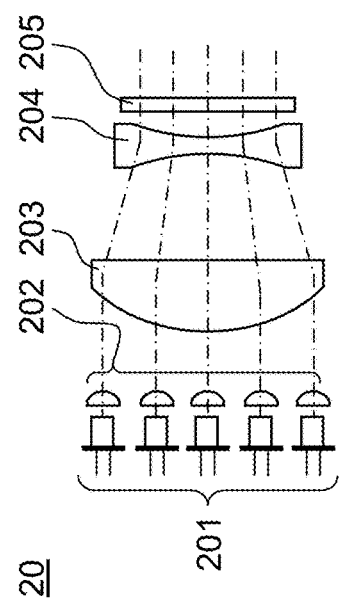

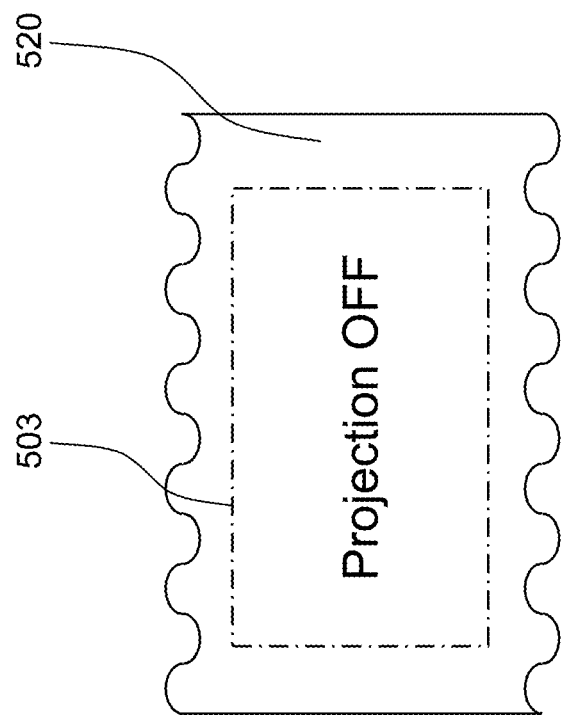
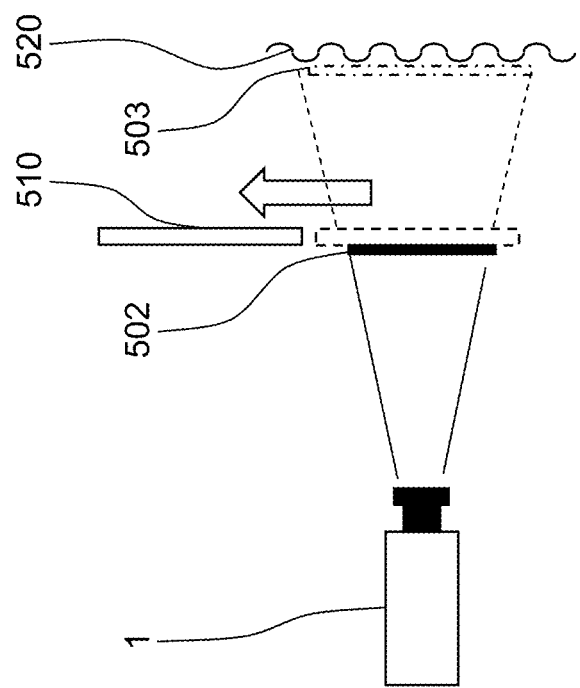

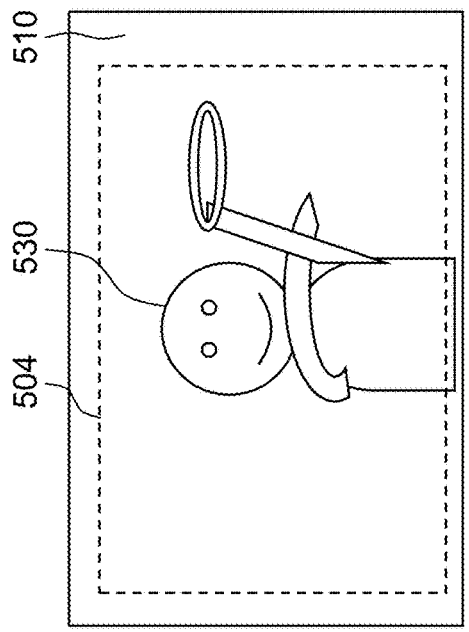
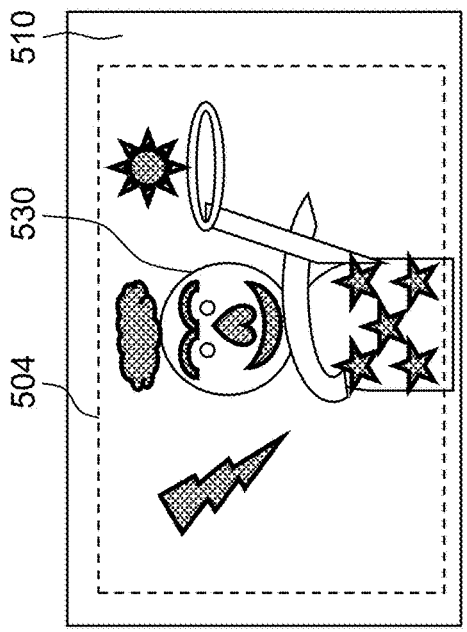
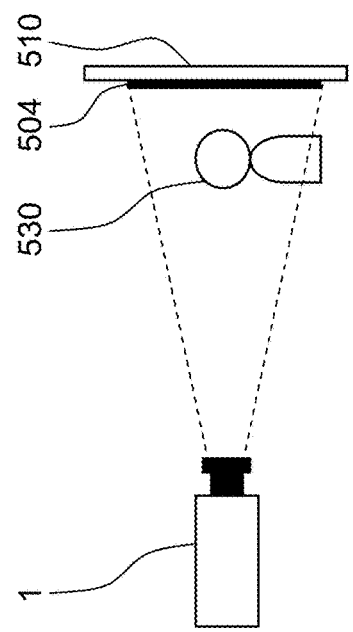
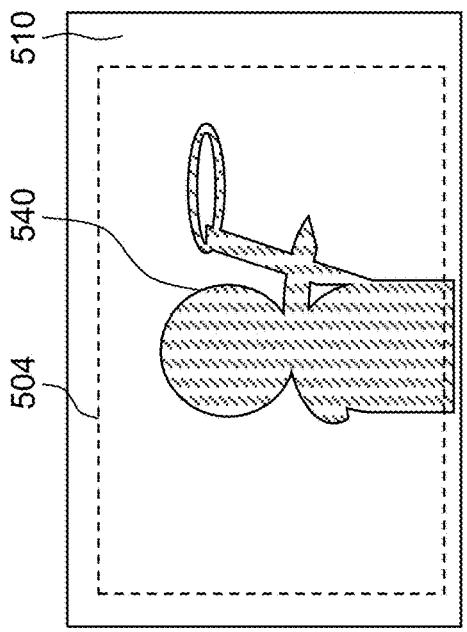

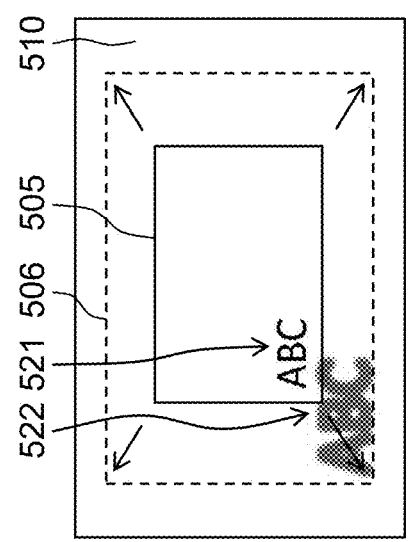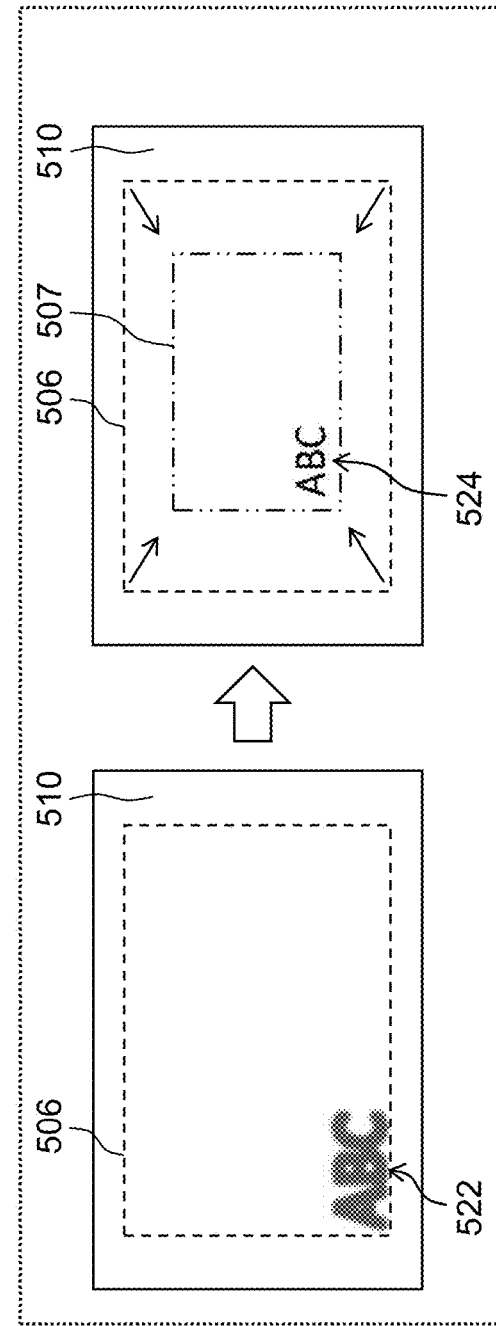

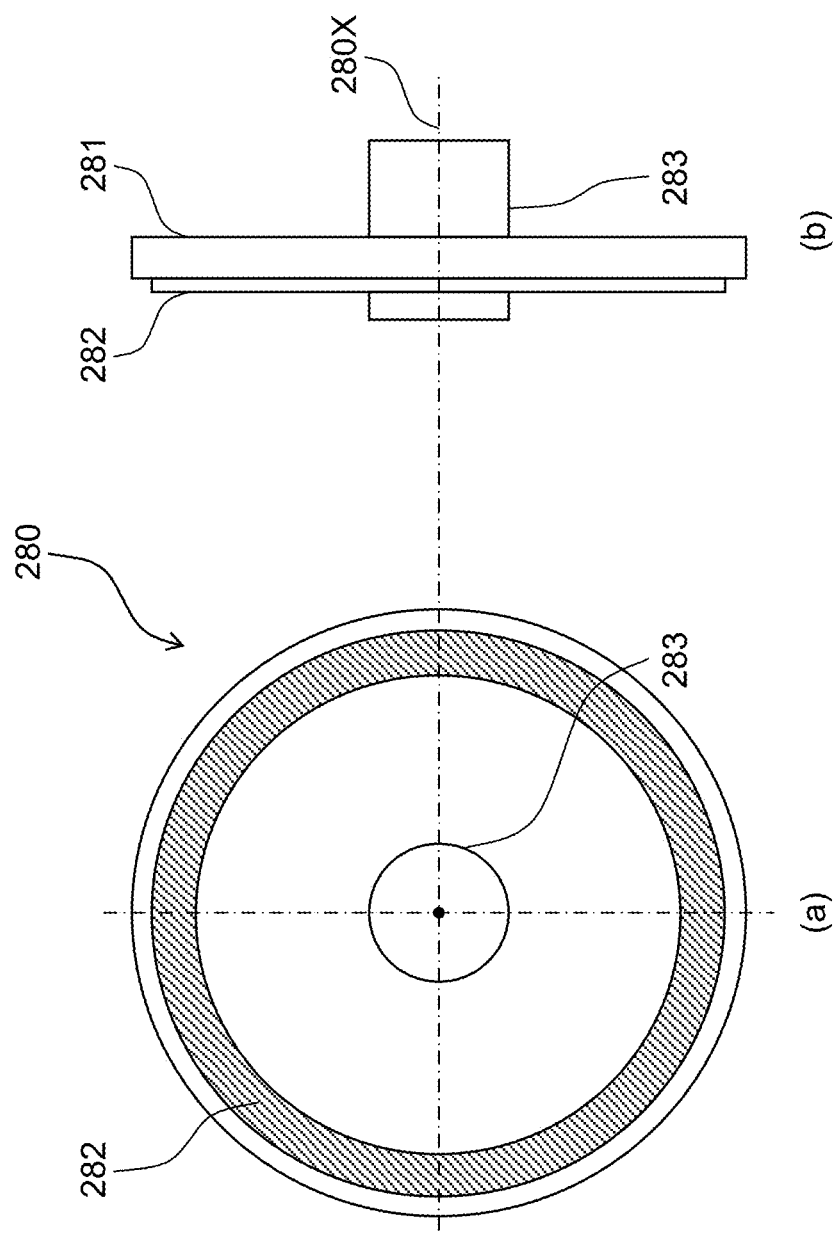

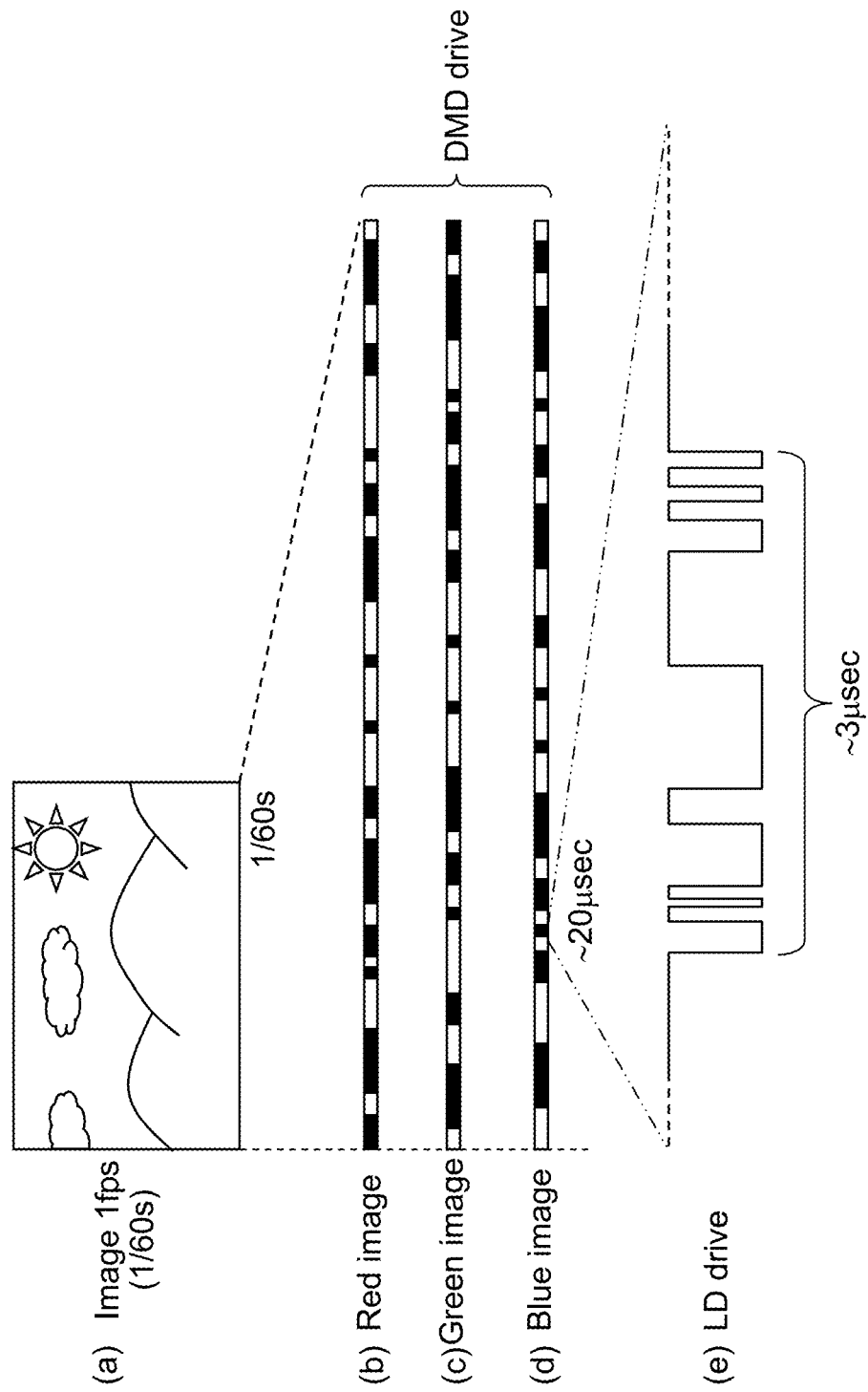

PROJECTION DISPLAY APPARATUS THAT CALCULATES A DISTANCE TO A DISPLAY SURFACE

BACKGROUND

Technical Field

The present disclosure relates to a projection display apparatus.

Description of the Related Art

Projection display apparatuses have been widely used to display large-screen images for movies, conferences, presentations, and other events. Such apparatuses can project projection light for image display onto an approximately flat white projection surface so as to display an image that is in sharp focus and undistorted in the entire surface.

Furthermore, projection mapping technology using a projection display apparatus has been developed in the recent years. According to this technology, existing buildings and other deep three-dimensional subjects can be used as projection surfaces, and images can be projected onto the same positions as the subjects, thereby giving a three-dimensional appearance to the subjects. Thus, new projection approaches have been developed to improve entertainment.

Assume that in a projection display apparatus, the optical axis of the apparatus is not perpendicular to the plane of the projection surface, or in other words, the distance from the apparatus to the surface is not equal between the surface edges and the optical axis. In this case, the surface is not perpendicular to the optical axis, so that the image is distorted on the surface. A well-known approach to avoiding this problem is to previously subject the image to a distortion process so as to be displayed without distortion on the surface.

There has been an apparatus developed to achieve such distortion correction by measuring the distance from the apparatus to the optical axis on the projection surface (plane) and the distance from the apparatus to a plurality of positions on the surface edges (e.g., Patent Literature 1: Japanese Unexamined Patent Application Publication No. 2008-46314). This apparatus uses the distance information about the measurement results at the plurality of positions to calculate the inclination angle of the surface (e.g., by triangulation method), thereby achieving distortion correction.

Patent Literature 1 discloses a projector including an optical modulator for amplitude-modulating the intensity of projection light, and a light receiver for receiving the projection light reflected by the projection surface. The light receiver includes a plurality of light-receiving elements to receive the reflected light at a plurality of light receiving points. The projector of Patent Literature 1 acquires a time-phase difference from the optical modulator and the plurality of light-receiving elements, thereby measuring the distance from the apparatus to the plurality of distance measurement points.

SUMMARY

The present disclosure provides a projection display apparatus for projecting projection light to display an image onto a projection surface, the apparatus being capable of easily measuring the distance from the apparatus to the projection surface.

The projection display apparatus according to the present disclosure projects projection light to display an image onto a projection surface. The apparatus includes a light source unit, a light deflector, a first light receiver, a second light receiver, and a calculator. The light source unit emits light for producing the projection light. The light deflector deflects at least part of incident light coming from the light source unit to a first optical path so as to produce the projection light. The light deflector also deflects a remaining part of the incident light to a second optical path different from the first optical path. The first light receiver receives the at least part of the incident light that has traveled along the first optical path and then has been reflected by the projection surface. The second light receiver receives the remaining part of the incident light that has traveled along the second optical path from the light deflector. The calculator calculates a distance from the projection display apparatus to the projection surface based on a light reception result obtained by the first light receiver receiving the at least part of the incident light and a light reception result obtained by the second light receiver receiving the remaining part of the incident light.

The projection display apparatus according to the present disclosure uses the light that has traveled along the first optical path and then has been reflected by the projection surface, and the light that has been deflected by the light deflector and then has traveled along the second optical path in order to easily measure the distance to the projection surface.

BRIEF DESCRIPTION OF DRAWINGS

FIGS. 7A to 7D are schematic diagrams showing the influence of changes in the configuration of light source unit 20;

FIGS. 11A and 11B are schematic diagrams of a second application example of distance measurement results in projection display apparatus 1;

FIGS. 12A to 12D are schematic diagrams of a third application example of distance measurement results in projection display apparatus 1;

FIGS. 15A and 15B are schematic diagrams of an example of optical zooming in projection display apparatus 1A;

FIG. 17 shows an example configuration of phosphor wheel 280 shown in FIG. 16; and FIG. 18 shows a schematic diagram of the operation of projection display apparatus 1B according to a third exemplary embodiment.

DETAILED DESCRIPTION OF THE PREFERRED EMBODIMENT

Figure 1:
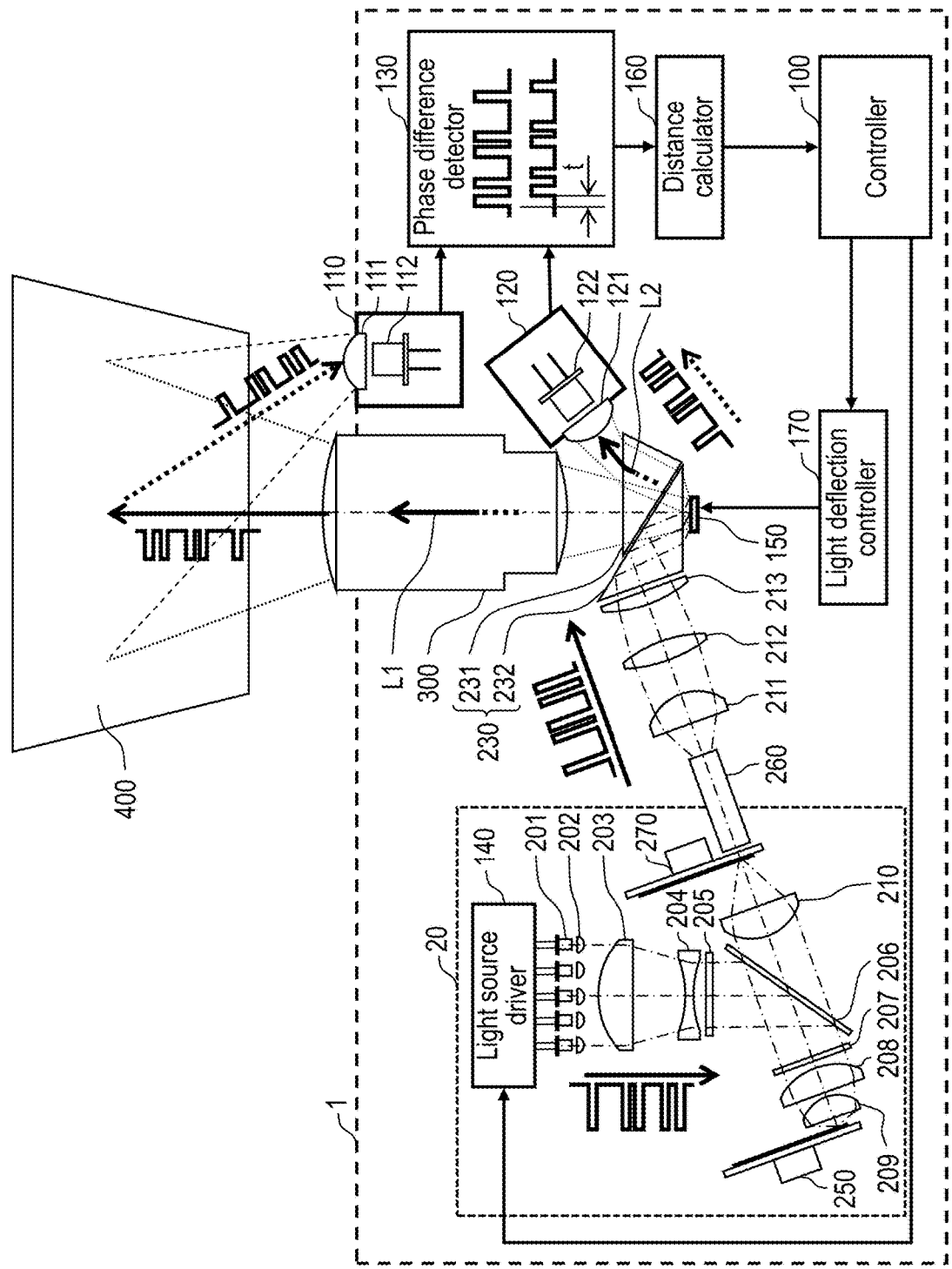
FIG. 1 shows an example configuration of projection display apparatus 1 according to a first exemplary embodiment.

An embodiment will now be described in detail with reference to the accompanying drawings whenever necessary. However, unnecessarily detailed descriptions may be omitted. For example, well-known matter and substantially the same configuration as described earlier may not be described repeatedly to avoid redundancy and to help those skilled in the art understand them easily.

The inventors have provided the accompanying drawings and the following description to make those skilled in the art fully understand the present disclosure, and do not intend to limit the claimed subject matter.

The Reason for which the Present Disclosure has been Made

Prior to describing specific exemplary embodiments of the present disclosure, the reason for which the present disclosure has been made will be described as follows.

The technique disclosed in Patent Literature 1 performs distance measurement by calculating the time-phase difference between a drive signal for allowing the optical modulator to modulate the light emitted from the light source and an optical signal obtained when the light receiver receives the light reflected by the projection surface. In short, this technique compares the drive signal for optical modulation with the optical signal entered to the light receiver with a delay. It is known that light travels about 300,000 km per second. Assuming that the distance to a subject is 3 m, the apparatus is to have a measurement accuracy of 20 nanoseconds as the delay period of the optical signal corresponding to 6 m to and from the subject.

Meanwhile, the amount of light emitted to the projection surface can be increased by using a plurality of high-output solid-state light sources as light sources in the apparatus. However, the output of the projection light in this case is subjected to the following influences: the difference in the optical path length caused by the arrangement of each light source in the apparatus; variations in the timing of emission due to the individual difference of the drive circuit and the light sources; the difference in the output between the light sources; jitter; and other problems. This makes it difficult to make the drive waveform of the drive signal coincide with the waveform of the optical signal in the light receiver. To prevent this happening, the above-mentioned influences are avoided by adjusting each light source and the circuit constants.

As another well-known structure, a distance image sensor composed of a plurality of pixels is used as the light receiver to obtain distance measurement data at a plurality of points on the projection surface. In this structure, the number of pixels of the distance image sensor increases with increasing number of measurement points. This reduces each pixel size, and hence, reduces light sensitivity. Moreover, this structure causes parallax between the image produced by the apparatus and the position of the image sensor used as the light receiver. As a result, if any modifications are made in the apparatus, such as a lens replacement, a change in the zoom position, or a lens shift, the distance image sensor will change the readout position depending on the changed positional information, resulting in complicating the structure of the apparatus.

Meanwhile, in the projection mapping, which is becoming rapidly popular in recent years, it is expected to detect the distance to the subject and control images depending on the distance. For example, in the case of controlling an image in response to a subject moving a distance of 3 cm forward or backward, the apparatus is to calculate the time for the light to travel a distance of 6 cm. In short, the apparatus is to have a high measurement accuracy of about 200 picoseconds. Moreover, the projection mapping is to perform the image control and the projection operation without position error. To satisfy these requirements, it has been expected to provide an apparatus that does not require any adjustments in the case of a lens replacement, a change in the zoom position, a lens shift, or other modifications, and that can also set the detection position for distance measurement arbitrarily with respect to a projected image.

As an apparatus to meet these expectations, the present disclosure provides a projection display apparatus capable of performing real-time distance measurement without greatly changing the configuration of the existing apparatus. This apparatus maintains the accuracy of the distance measurement regardless of an increase in the number of light sources. As another advantage, this apparatus does not require any adjustments to the position for distance measurement in the case of a lens replacement, a change in the zoom position, a lens shift, or other modifications, and can also set the detection position for distance measurement arbitrarily for a projected image.

First Exemplary Embodiment

A first exemplary embodiment will be described as follows with reference to FIGS. 1 to 12D. In the following specific exemplary embodiment of the projection display apparatus according to the present disclosure, the apparatus includes a digital micromirror device (hereinafter, DMD) as an example of the light deflector.

1-1. Configuration

The configuration of the projection display apparatus according to the present exemplary embodiment will now be described with reference to FIG. 1. FIG. 1 shows an example configuration of projection display apparatus 1 according to the first exemplary embodiment.

As shown in FIG. 1, projection display apparatus 1 includes light source unit 20, DMD 150, and projection optical system 300. Apparatus 1 projects projection light for image display to projection surface 400 which faces projection optical system 300 and can come in many varieties.

Light source unit 20 emits light for producing the projection light (detailed later). DMD 150 provides on-off control of each pixel in the image to spatially modulate the incident light coming from light source unit 20, and emits the modulated light (hereinafter also referred to as "DMD-ON light") to projection optical system 300. System 300 emits the DMD-ON light to the outside of projection display apparatus 1 as the projection light.

In DMD 150, of the incident light from light source unit 20, the light that is not used as the DMD-ON light is deflected so as not to strike projection optical system 300

(hereinafter also referred to as "DMD-OFF light"). In the present exemplary embodiment, the distance from projection display apparatus 1 to projection surface 400 is measured using the DMD-OFF light to facilitate distance measurement. The configuration of apparatus 1 will now be described in detail.

Projection display apparatus 1 shown in FIG. 1 further includes light deflection controller 170, first light receiver 112, second light receiver 122, phase difference detector 130, distance calculator 160, and controller 100. These units are electrically connected to each other.

Light deflection controller 170 is a control circuit for controlling DMD 150, which is an example of the light deflector. Controller 170 receives a control signal from controller 100, sends a modulated signal to DMD 150, and produces an image with various light intensities in a time division manner.

DMD 150 includes a panel composed of a plurality of movable micromirrors. Each micromirror basically corresponds to one pixel in the panel of DMD 150. DMD 150 provides on-off control of the micromirrors based on the modulated signal received from light deflection controller 170, thereby forming an image on the panel. In the on-off control, DMD 150 changes the angle of each micromirror, thereby switching whether the reflected light is directed to projection optical system 300 or not for each micromirror.

To be more specific, DMD 150 deflects the reflected light on the on-state micromirrors to a first optical path L1 so as to produce DMD-ON light. The first optical path L1 leads through projection optical system 300 to the outside of projection display apparatus 1. On the other hand, DMD 150 deflects the reflected light on the off-state micromirrors to a second optical path L2 so as to produce DMD-OFF light. The second optical path L2 lies inside apparatus 1.

First light receiver 112 receives the DMD-ON light reflected by projection surface 400. First light receiver 112 is oriented to the projection light coming from projection optical system 300 as shown in FIG. 1. First light receiver 112 can be a photodiode and be housed in light shielding case 110 equipped with condenser lens 111.

Second light receiver 122 receives the DMD-OFF light that has passed through DMD 150 and then has traveled along the second optical path L2. Second light receiver 122 is located near total internal reflection prism 230, which will be described later, in projection display apparatus 1. Second light receiver 122 can be a photodiode and be housed in light shielding case 120 equipped with condenser lens 121.

Phase difference detector 130 is a detection circuit for detecting the phase difference between signals with specified waveforms. To be more specific, phase difference detector 130 detects the time-phase difference between the light output indicating the light reception result obtained by first light receiver 112 and the light output indicating the light reception result obtained by second light receiver 122.

Distance calculator 160 calculates the distance corresponding to the phase difference detected by phase difference detector 130. Distance calculator 160 can be composed of various calculation circuits. Phase difference detector 130 and distance calculator 160 are examples of the calculator in the present exemplary embodiment.

Controller 100 controls of the entire operation of projection display apparatus 1. Controller 100 includes a CPU or MPU, which can implement specific functions in cooperation with software, and further includes internal memory such as flash memory. Controller 100 reads data and programs from the internal memory and performs various arithmetic processing, thereby achieving various functions.

For example, controller 100 generates various control signals based on an external image signal or the like. Controller 100 makes light source unit 20, phase difference detector 130, and distance calculator 160 operate at the control timing of DMD 150 determined by light deflection controller 170. For example, controller 100 makes light source unit 20 produce light (pulsed light) with a light output waveform for distance measurement.

Controller 100 can be a dedicated electronic circuit designed to implement specified functions or a hardware circuit such as a reconfigurable electronic circuit. Controller 100 can be composed of various semiconductor integrated circuits such as a CPU, an MPU, a microcomputer, a DSP, an FPGA, and an ASIC. The functions can be properly divided among controller 100, phase difference detector 130, distance calculator 160, and light deflection controller 170. For example, a function of distance calculator 160 can be implemented by controller 100.

1-1-1. The Configuration of the Light Source Unit

In projection display apparatus 1 according to the present exemplary embodiment, light source unit 20 emits a plurality of colors of light for generating projection light in a time division manner. The configuration of light source unit 20 in the present exemplary embodiment will now be described with reference to FIGS. 1 to 4.

As shown in FIG. 1, light source unit 20 includes a plurality of semiconductor lasers (hereinafter "LDs") 201, light source driver 140, a plurality of lenses 202, lens 203, lens 204, diffuser 205, and dichroic mirror 206. In the present exemplary embodiment, light source unit 20 produces a plurality of colors of light using LDs 201 for emitting blue light.

LDs 201 emit blue light with a wavelength of, for example, 447 to 462 nm in the form of linearly polarized light. LDs 201 are arranged in such a manner that the light outgoing from them can be s-polarized with respect to the incident surface of dichroic mirror 206.

Light source driver 140 is a drive circuit for driving LDs 201. Driver 140 controls the waveform of the light output of LDs 201, thereby producing the pulsed light for distance measurement.

Lenses 202 are collimator lenses for collimating the light from LDs 201. Lenses 202 can be in one-to-one correspondence with LDs 201.

Lenses 203 and 204 compose an afocal system, which converges parallel light and produces parallel light. To be more specific, lens 203 is a condenser lens for collecting the parallel light from lenses 202, whereas lens 204 is a concave lens for collimating the light from lens 203.

Diffuser 205 diffuses the light coming from lens 204. After passing through diffuser 205, the light strikes dichroic mirror 206.

Figure 2:
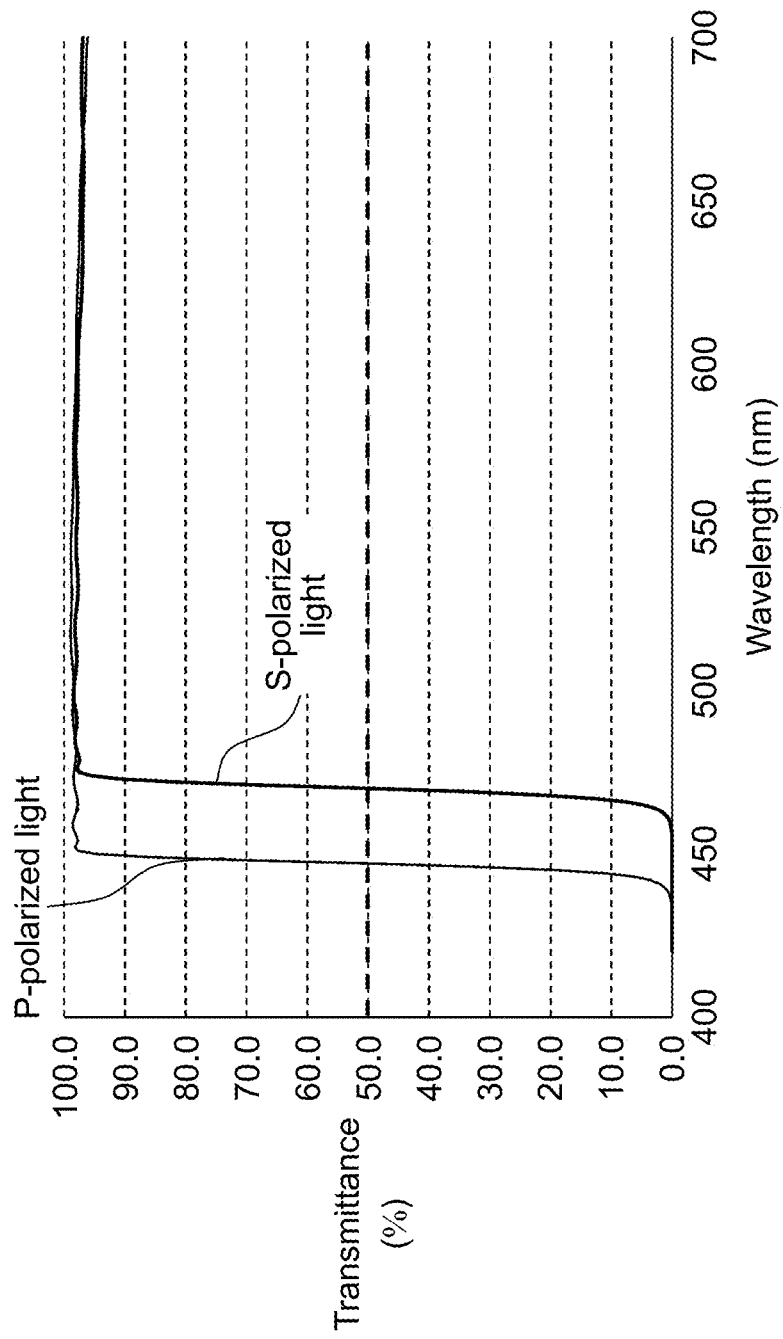
FIG. 2 is a graph showing the spectral transmittance of dichroic mirror 206 shown in FIG. 1.

Dichroic mirror 206 has specific spectral transmittance characteristics, which are shown in FIG. 2.

FIG. 2 shows the characteristics of dichroic mirror 206 obtained when the incident light is s- and p-polarized. In FIG. 2, when dichroic mirror 206 has a transmittance of 50%, the wavelength of the s-polarized light is 465 nm, and the wavelength of the p-polarized light is 442 nm, both of which are in the blue light region. Dichroic mirror 206 with the above-mentioned characteristics either transmits or reflects blue light. The characteristics shown in FIG. 2 enable dichroic mirror 206 to transmit at least 96% of light containing green and red components.

Referring back to FIG. 1, light source unit 20 further includes quarter-wave plate 207, condenser lenses 208 and 209, and phosphor wheel 250. In unit 20, the s-polarized component of the light (blue light) that has emitted from LDs 201 and struck dichroic mirror 206 is reflected by dichroic mirror 206 and travels toward quarter-wave plate 207.

The blue light reflected by dichroic mirror 206 strikes quarter-wave plate 207. Quarter-wave plate 207 is a retarder with a phase difference of a quarter wavelength near the central wavelength of emission of LDs 201. After passing through quarter-wave plate 207, the light is circularly polarized and strikes condenser lenses 208 and 209.

Condenser lenses 208 and 209 focus the incident light onto the surface of phosphor wheel 250. The focal length of condenser lens 209 is set in such a manner that the convergence angle does not exceed 40 degrees. As a result, the focal spot of the blue light is formed near phosphor wheel 250.

Figure 3:
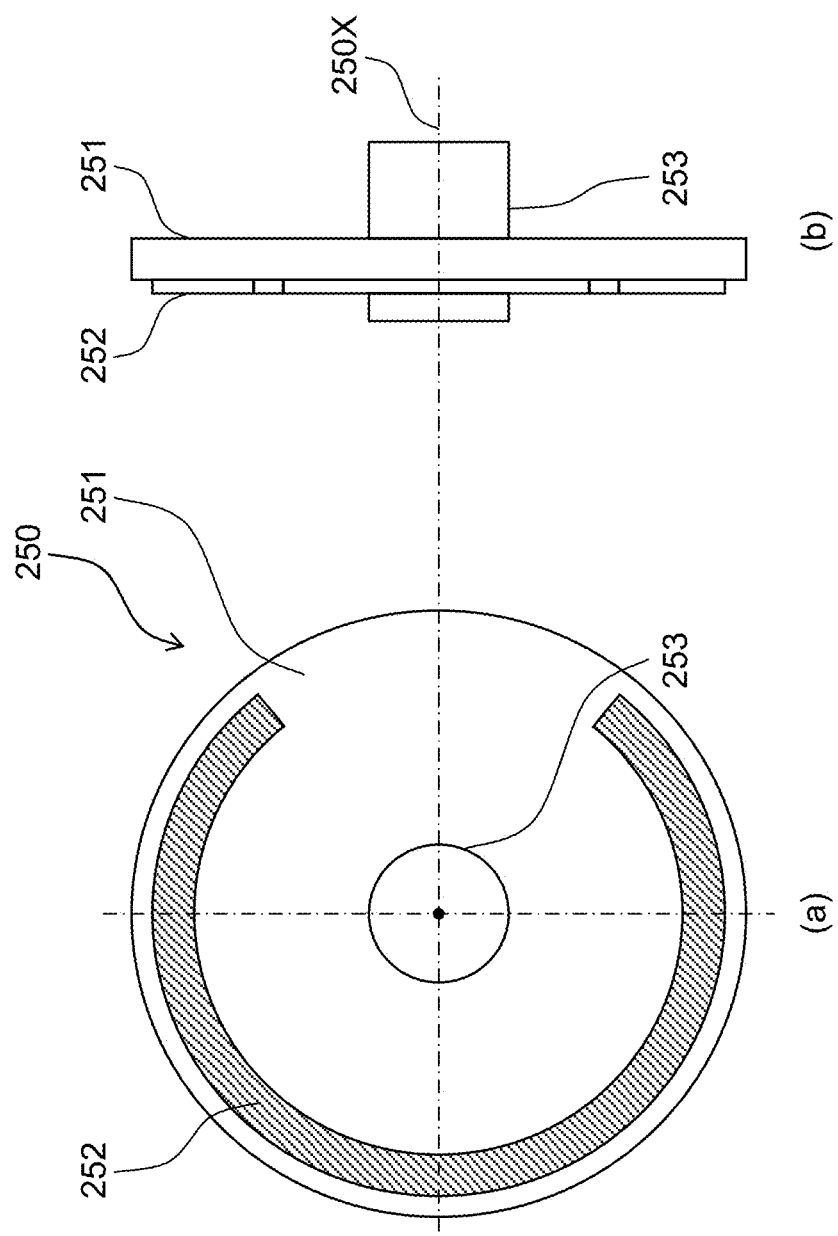
FIG. 3 shows an example configuration of phosphor wheel 250 shown in FIG. 1.

Phosphor wheel 250 in the present exemplary embodiment is an example of a light wavelength converter, in which yellow light (containing green and red wavelength components) is produced by fluorescence emission using the blue light as excitation light. The configuration of phosphor wheel 250 will now be described with reference to FIG. 3. FIG. 3(a) is a front view of wheel 250 seen from the incident surface. FIG. 3(b) is a side view of wheel 250, which is a lateral view of FIG. 3(a).

As shown in FIGS. 3(a) and (b), phosphor wheel 250 includes circular aluminum substrate 251 and drive motor 253 located at the center of aluminum substrate 251. In wheel 250, drive motor 253 controls the rotation of aluminum substrate 251 about central axis 250X.

Phosphor wheel 250 further includes a reflective coating (not shown) on the surface of aluminum substrate 251 (on the incident surface), and phosphor layer 252 on the coating. The reflective coating is a metal layer or dielectric coating that reflects visible light. Phosphor layer 252 may contain a Ce-activated YAG yellow phosphor, which emits yellow light when excited by blue light. This phosphor has a crystal matrix whose typical chemical composition is $Y_3Al_5O_{12}$.

In phosphor wheel 250 in the present exemplary embodiment, phosphor layer 252 is substantially ring shaped with a gap. The gap is where phosphor layer 252 is not formed as shown in FIG. 3(a) and the reflective coating alone is formed to reflect blue light.

After excited by the spot light in the focal spot, phosphor layer 252 can generate heat while being phosphor-converted to yellow light. However, phosphor wheel 250 with aluminum substrate 251 is rotated about central axis 250X to prevent phosphor layer 252 from being heated by the excitation light. This can maintain the phosphor conversion efficiency stably.

When phosphor-converted during the rotation of phosphor wheel 250, the spot light incident on phosphor layer 252 is emitted as light with green and red components. At the same time, the light that has struck the reflective coating is reflected by this coating. This allows the phosphor-converted light to be emitted from the incident surface of phosphor wheel 250. As a result of the phosphor conversion, the light with the green and red components are turned into randomly polarized natural light.

Meanwhile, when the spot light strikes the gap of phosphor wheel 250 where phosphor layer 252 is not formed and the reflective coating alone is formed, the spot light is reflected without being phosphor-converted and is emitted from wheel 250 as the same light with the blue component. Thus, when reflected by the reflective coating, the outgoing light with the blue component is phase-inverted and turned into oppositely circularly polarized light.

Referring back to FIG. 1, the light from phosphor wheel 250 is collimated to approximately parallel light by condenser lenses 208 and 209 and strikes quarter-wave plate 207. Of the incident light on quarter-wave plate 207, the light with the green and red components passes through quarter-wave plate 207 as the same randomly polarized natural light as before, and then passes through dichroic mirror 206. In contrast, the light with the blue component is converted from the oppositely circularly polarized light into p-polarized light by quarter-wave plate 207 and passes through dichroic mirror 206.

As described so far, dichroic mirror 206 transmits the light in the green and red regions obtained by phosphor conversion, and the light in the blue region polarization-converted efficiently by quarter-wave plate 207 and the reflective coating. These colored light rays are combined in a time division manner so as to be perceived as white light.

Light source unit 20 in the present exemplary embodiment further includes condenser lens 210 and color separation wheel 270. The light that has passed through dichroic mirror 206 strikes condenser lens 210 and is collected on color separation wheel 270.

Figure 4:
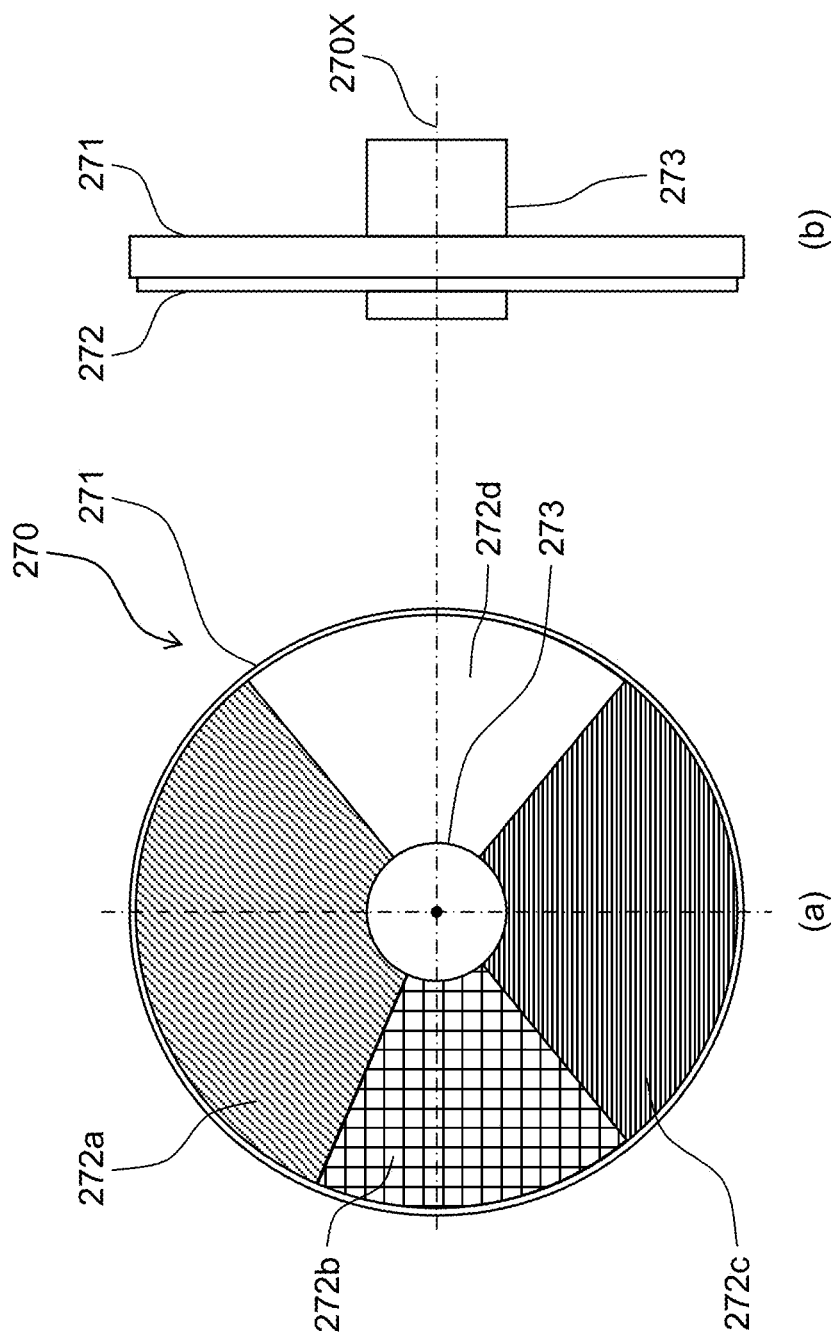
FIG. 4 shows an example configuration of color separation wheel 270 shown in FIG. 1.

Color separation wheel 270 separates the incident light to produce red, green, blue, and yellow light in a time division manner. The configuration of color separation wheel 270 will now be described with reference to FIG. 4. FIG. 4(a) is a front view of wheel 270 seen from the incident surface. FIG. 4(b) is a side view of wheel 270, which is a lateral view of FIG. 4(a).

As shown in FIGS. 4(a) and (b), color separation wheel 270 includes circular transparent substrate 271 and drive motor 273 located at the center of transparent substrate 271. In wheel 270, drive motor 273 controls the rotation of transparent substrate 271 about central axis 270X.

Transparent substrate 271 may be composed of a glass plate with more than a predetermined transmittance over the visible range. Color separation wheel 270 further includes dichroic coating 272 on the surface of transparent substrate 271 (on the incident surface), which transmits only a desired wavelength region.

Dichroic coating 272 may be divided into four segments 272a to 272d as shown in FIG. 4(a). The coating in segment 272a transmits light in the yellow region (the green region+ the red region) only. The coating in segment 272b transmits light in the red region only. The coating in segment 272c transmits light in the green region only. The coating in segment 272d transmits light in either the blue region or the entire visible region. The sizes of segments 272a to 272d can be appropriately determined to equalize the amount of each color light obtained in the rotation period of color separation wheel 270.

In projection display apparatus 1, controller 100 can make phosphor wheel 250 (FIG. 3) and color separation wheel 270 (FIG. 4) rotate synchronously. For example, these wheels are rotated synchronously in such a manner that the positions of phosphor layer 252 can coincide with the positions of segments 272a to 272c for the yellow, red, and green regions in each rotation.

As a result, the light with the yellow component (containing the green and red components) outgoing from phosphor layer 252 in FIG. 3 is split into the light in the yellow, red, and green regions while passing through segments 272a, 272b, and 272c, respectively, of dichroic coating 272 of FIG. 4. Meanwhile, the light emitted from LDs 201 and reflected on the gap of aluminum substrate 251 of FIG. 3 where phosphor layer 252 is not formed, passes through segment 272d of dichroic coating 272 of FIG. 4 as light in the blue region.

As described so far, in light source unit 20 in the present exemplary embodiment, the light in the yellow and blue regions emitted from phosphor wheel 250 is split into the red, green, blue, and yellow regions by color separation wheel 270 and is eventually emitted from light source unit 20. Of the light emitted from light source unit 20, the light in the red, green, and blue regions can be chosen as three primary colors. The three primary colors can be combined in a time division manner to obtain excellent white balance as a characteristic of emission. Furthermore, the on-off control provided by DMD 150 can achieve desired colors in the chromaticity coordinate. The light in the yellow region can be used to synthesize white light (white image) in order to ensure the image brightness.

Projection display apparatus 1 shown in FIG. 1 further includes rod integrator 260, lenses 211, 212, and 213, and total internal reflection (hereinafter "TIR") prism 230. The color rays of the light emitted from light source unit 20 strike rod integrator 260 in a time division manner.

Rod integrator 260 may be a solid rod and be made of glass or other transparent material. Rod integrator 260 reflects the incident light a plurality of times inside it to produce light with an equalized light intensity distribution. Rod integrator 260 may alternatively be a hollow rod with a mirror surface on the inner wall.

Lenses 211, 212, and 213 are relay lenses which allow the light outgoing from rod integrator 260 to substantially form an image on DMD 150. The light from rod integrator 260 passes through lenses 211, 212, and 213, and strikes TIR prism 230. TIR prism 230 is composed of two prisms 231 and 232. Prisms 231 and 232 have a thin air layer between them. The air layer totally reflects the light incoming from lens 213 at a critical angle or a greater angle. The light that has passed through lens 213 and struck prism 232 is totally reflected by the air layer and is substantially formed into an image on DMD 150.

The light incident on DMD 150 is reflected as either DMD-ON light or DMD-OFF light and passes through TIR prism 230. The DMD-ON light travels along the first optical path L1 in projection optical system 300 and is emitted onto projection surface 400 to project an image.

The image projected in a time division manner by the light in each of the red, green, blue, and yellow regions with various light intensities of the DMD-ON light can reach projection surface 400 and be recognized as full-color image. In this case, if the time-division cycle were slow, it might appear as color flicking to the human eye. In contrast, when the image information is produced at 60 frames per second (60 fps), one cycle corresponding to the red to yellow regions can be driven at a triple speed (180 fps) so that the color flickering can be reduced.

Of the DMD-ON light that has reached projection surface 400, part of the light reflected from surface 400 is collected by condenser lens 111 and strikes first light receiver 112. Light shielding case 110 prevents first light receiver 112 from receiving stray light reflected by unintended portions of the optical members in projection display apparatus 1.

Meanwhile, the DMD-OFF light from DMD 150 travels along the second optical path L2, is collected by condenser lens 121, and strikes second light receiver 122. Light shielding case 120 allows second light receiver 122 to receive only the light (DMD-OFF light) directly coming from DMD 150 and to block other light, such as stray light reflected by unintended portions of the optical members.

1-2. Operation

The operation of projection display apparatus 1 structured as above will be described as follows.

In projection display apparatus 1 according to the present exemplary embodiment (FIG. 1), light source driver 140 of light source unit 20 generates pulsed light with a pulse waveform for distance measurement for each image frame displayed on projection surface 400 (pulsed-light generation operation). In this case, light deflection controller 170 drives DMD 150 in such a manner as to deflect part of the pulsed light as DMD-ON light to the first optical path L1, and at the same time, to deflect the remaining part of the pulsed light as DMD-OFF light to the second optical path L2 (DMD drive operation).

First light receiver 112 receives the DMD-ON light with a pulse waveform, which has been reflected by projection surface 400. Second light receiver 122 receives DMD-OFF light with the same pulse waveform as the DMD-ON light. Phase difference detector 130 detects, from the light reception results obtained by first and second light receivers 112 and 122, the phase difference between the pulse waveforms of the received light. Distance calculator 160 calculates the distance corresponding to the detected phase difference (distance calculation operation).

The above operation of projection display apparatus 1 allows displaying various images for viewers on projection surface 400, and at the same time, measuring the distance from apparatus 1 to projection surface 400 in real time. The operation of apparatus 1 according to the present exemplary embodiment will be described in detail as follows.

1-2-1. Pulsed Light Generation Operation

Figure 5:
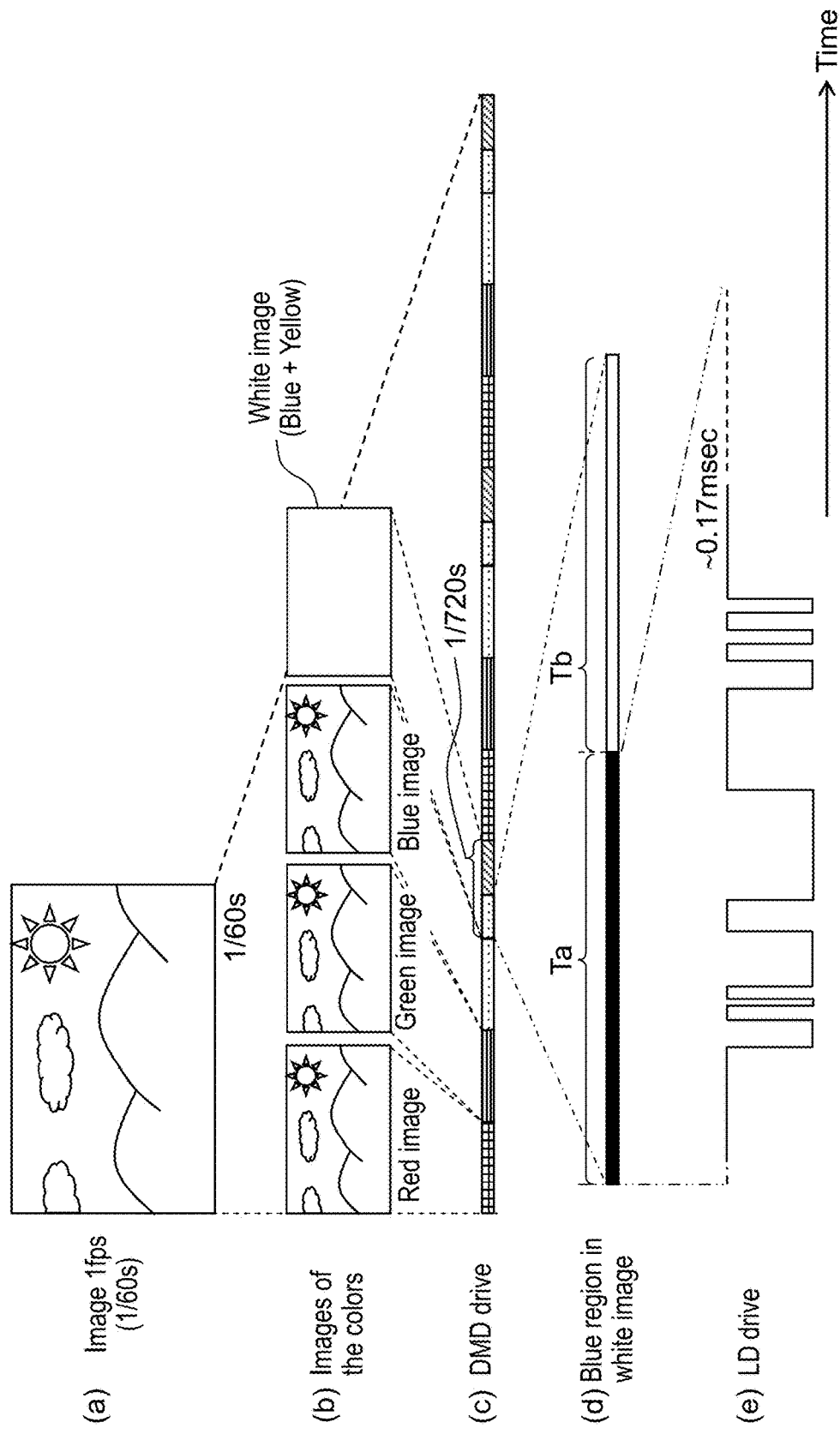
FIG. 5 is a schematic diagram of a pulsed-light generation operation in the first exemplary embodiment.

According to the pulsed-light generation operation in the present exemplary embodiment, while performing image display for each color in a time division manner for each frame, projection display apparatus 1 generates pulsed light for distance measurement by making use of the period (white image) for ensuring the brightness of the entire image. The pulsed-light generation operation performed by apparatus 1 will now be described with reference to FIG. 5. FIG. 5 is a schematic diagram of a pulsed-light generation operation in the present exemplary embodiment.

FIG. 5(a) shows a one-frame image projected by projection display apparatus 1. FIG. 5(b) shows images of the colors contained in the one-frame image. FIG. 5(c) shows the timing to drive DMD 150 corresponding to the image of each color. FIG. 5(d) shows the timing to display the blue region in the white image. FIG. 5(e) shows the timing to drive LDs 201.

FIG. 5(a) to (e) show the timings to produce various images in one frame to be projected onto projection surface 400. For example, when the image for the viewers is set to be produced to 60 fps, projection display apparatus 1 produces a one-frame image in 1/60 seconds as shown in FIG. 5(a). According to the present exemplary embodiment, the image for the viewers is produced by combining the light in the red, green, blue, and yellow regions in a time division manner (FIGS. 5(b) and (c)). If driven at a triple speed to prevent color flickering, one cycle in the red to yellow regions is 180 fps.

Projection display apparatus 1 can perform image display in a time division manner by superimposing the difference image between the red, green, and blue images on white image containing simple luminance information as shown in FIG. 5(b). The white image shown in FIG. 5(b) is produced by combining the light in the blue region obtained from segment 272d and the light in the yellow region obtained from segment 272a shown in color separation wheel 270 (FIG. 4).

Assume that the red, green, blue, and white images are produced in the same period of one cycle corresponding to the red to yellow regions (1/180 seconds long) as shown in FIG. 5(c). In this case, the production period of the white image is 1/720 seconds. During this period, the light in the blue region and the light in the yellow region are sequentially outputted (FIG. 5(d)) to synthesize the white image (FIG. 5(b)).

In projection display apparatus 1 (FIG. 1), light source driver 140 can pulse-drive LDs 201 in a first half period Ta of the period in which the light in the blue region is outputted (FIG. 5(d)) during the above-described production period of the white image. Assume that the white image is synthesized by setting the time ratio of the light in the blue region to the light in the yellow region to 1:1. In this case, the length of the blue region period in the white image (first half period Ta+second half period Tb) shown in FIG. 5(d) is 1/1440 seconds. If the pulsed light is generated at an on-off ratio of 1:1 (i.e., duty ratio is 1/2) over the first half period Ta, the pulsed light continues to be emitted for about 0.17 milliseconds in total.

During the emission of the pulsed light, light source driver 140 emits pulsed light having a waveform with irregular pulse intervals shown in FIG. 5(e). Light source driver 140 can emit the pulsed light either in the second half period Tb or in both the first half period Ta and the second half period Tb shown in FIG. 5(d). Furthermore, the duty ratio of the pulsed light is not limited to 1/2, and can alternatively be less than 1/2.

1-2-2. DMD Drive Operation

Figure 6:
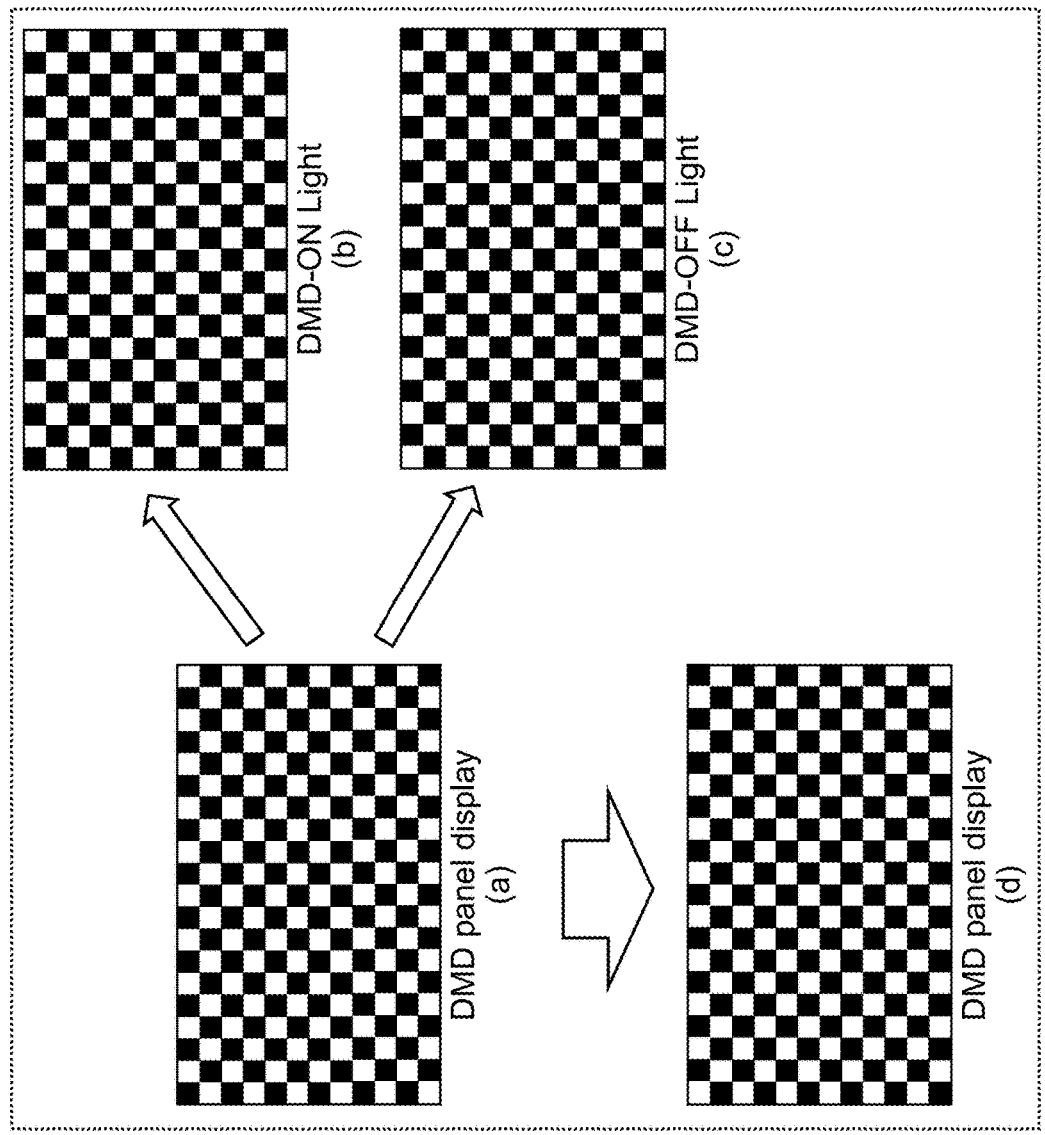
FIG. 6 is a schematic diagram of DMD drive operation in the first exemplary embodiment.

The DMD drive operation, which is performed synchronously with the above-described pulsed-light generation operation, will now be described with reference to FIG. 6. FIG. 6 is a schematic diagram of the DMD drive operation in the present exemplary embodiment.

In the DMD drive operation in the present exemplary embodiment, projection display apparatus 1 (FIG. 1) allows light deflection controller 170 to control image display on the panel of DMD 150 at the timing to emit the pulsed light, thereby deflecting the pulsed light to the first optical path L1 and the second optical path L2. For example, light deflection controller 170 allows a first pattern image to be displayed on the panel of DMD 150 in the first half period Ta of FIG. 5(d). A display example of the first pattern image on the panel of DMD 150 is shown in FIG. 6(a).

In the example shown in FIG. 6(a), the first pattern image has a checker-board pattern in the entire panel. FIG. 6(b) shows the DMD-ON light based on the image display of FIG. 6(a). FIG. 6(c) shows the DMD-OFF light based on the image display of FIG. 6(a).

When the panel of DMD 150 displays the checker-board pattern shown in FIG. 6(a), the DMD-ON light is emitted to projection surface 400 through projection optical system 300 (see FIG. 1) so as to project the same checker-board pattern as that shown on the panel (FIG. 6(b)). The DMD-ON light is reflected by projection surface 400 and strikes first light receiver 112. In this case, the phase (timing) of the pulse waveform of the reflected light is delayed by the time required for the distance to and from projection surface 400.

In contrast, the DMD-OFF light displays a pattern, which is the reverse of the pattern of the DMD-ON light (FIG. 6(b)), as shown in FIG. 6(c). The DMD-OFF light strikes second light receiver 122 without, unlike the DMD-ON light, the delay corresponding to the distance to projection surface 400. The distance calculation operation based on the light reception results obtained by first and second light receivers 112 and 122 will be described later.

Light deflection controller 170 allows a second pattern image to be displayed on the panel of DMD 150 in the second half period Tb shown in FIG. 5(d). A display example of the second pattern image is shown in FIG. 6(d). As shown in FIG. 6(d), the second pattern image is reversed from the first pattern image in brightness for each pixel.

In the above-described DMD drive operation, the display on the panel is reversed between the first half period Ta and the second half period Tb in the timing to display the blue region in the white image (FIG. 5(d)). As a result, an entirely blue screen with half intensity can be effectively obtained on projection surface 400. In a region for each pixel in the white image shown in FIG. 5(c), the effective time ratio of the blue region to the yellow region is 1:2. The amount of the light in the blue and yellow regions can be appropriately set, and these colors are combined to obtain a full-white image (white image on the entire screen) with an appropriate white balance.

In the DMD drive operation described so far, the first and second pattern images may have various other patterns instead of the checker-board pattern, such as vertical or horizontal stripes. Each pattern image may have an area ratio of the ON pixels to the OFF pixels of 1:1 in the entire panel, or ratios other than 1:1. As will be described later, the pattern in each pattern image may be localized in a certain region (see FIGS. 8A and 9).

1-2-3. Distance Calculation Operation

A distance calculation operation, which is performed with the above-described pulsed-light generation operation and DMD drive operation, will now be described.

In projection display apparatus 1 (FIG. 1), pulsed light produced by light source driver 140 (pulsed-light generation operation) is deflected to the two optical paths L1 and L2 by DMD 150 (DMD drive operation), and eventually received by first light receiver 112 and second light receiver 122.

Phase difference detector 130 detects the phase difference between the timing of the light pulse in the pulsed light received by first light receiver 112 and the timing of the light pulse in the pulsed light received by second light receiver 122. As indicated by the above-described timing of the light pulse, the light reception result obtained by first light receiver 112 is delayed from the light reception result obtained by second light receiver 122 depending on the optical path length, which is the distance to and from projection surface 400. Distance calculator 160 calculates the delay time based on the detection result obtained by phase difference detector 130, thereby calculating the distance to projection surface 400.

While making these series of operations synchronize with the image signal, projection display apparatus 1 controls light source driver 140, light deflection controller 170, phase difference detector 130, and distance calculator 160. This enables apparatus 1 to perform distance measurement for each image frame.

In the example described so far, the pulsed light used for distance measurement is nonperiodic and has irregular pulse intervals. If periodic pulsed light were used, the distance to projection surface 400 might largely change, causing the delay time to exceed the pulse interval. In such cases, it is likely that the distance calculation using the light pulse in the next cycle ends up with a wrong result. In contrast, using nonperiodic pulsed light can prevent this from happening.

The pulsed light used for distance measurement is not limited to nonperiodic pulsed light, but may be periodic pulsed light in some cases. For example, when the range of distance measurement is short in proportion to the optical path length corresponding to the pulse interval, periodic pulsed light can be used without problems. Furthermore, the light used for distance measurement in projection display apparatus 1 may have various other waveforms instead of the pulse waveform.

1-3. Influence of Changing the Light Source Configuration

The above-described distance measurement approach in projection display apparatus 1 can maintain the accuracy of distance measurement even when the number of LDs 201 is increased to increase the amount of light, or when the configuration of the light source is changed in other ways. This point will now be described with reference to FIGS. 7A to 7D.

FIGS. 7A to 7D show the influence of changing the configuration of light source unit 20 on the light intensity of light receivers 112 and 122. FIG. 7A shows light source unit 20 including one LD 201. FIG. 7B shows the waveforms of the pulsed light received by first and second light receivers 112 and 122 from light source unit 20 of FIG. 7A. When one LD 201 is used, the pulsed light for distance measurement that is produced in the pulsed-light generation operation has a stable pulse waveform hardly distorted from the drive waveform (FIG. 5($e$)) as shown in FIG. 7B.

FIG. 7C shows light source unit 20 including a plurality of LDs 201. FIG. 7D shows the waveforms of the pulsed light received by first and second light receivers 112 and 122 from light source unit 20 of FIG. 7C. When the plurality of LDs 201 are used as shown in FIG. 7C, first and second light receivers 112 and 122 are likely to be subject to the following influences: the difference in the optical path length caused by the arrangement of each light source in projection display apparatus 1; variations in the timing of emission due to the individual difference of the drive circuit and the light sources; the difference in the output between the light sources; jitter; and other problems. As a result, the pulsed light used for distance measurement shown in FIG. 7D is considered to have a distorted waveform different from the drive waveform.

Meanwhile, after the light is deflected by DMD 150, there are no factors that will change the timing of emission of the pulsed light along the optical paths L1 and L2, so that both first and second light receivers 112 and 122 receive pulsed light with similarly distorted waveforms. For this reason, phase difference detector 130 can detect the phase difference without being subject to various variations in projection display apparatus 1. As a result, apparatus 1 can perform stable distance measurement without the addition of any adjustment mechanism.

1-4. Division and Distance Measurement on the Projection Surface

The distance measurement approach in the present exemplary embodiment can change the pattern image for the DMD drive operation so as to calculate the distance from projection display apparatus 1 to different positions on projection surface 400. As an example of dividing projection surface 400 into a plurality of regions for distance measurement, an example of dividing into nine regions will be described as follows with reference to FIGS. 8A to 9.

Figure 8A:
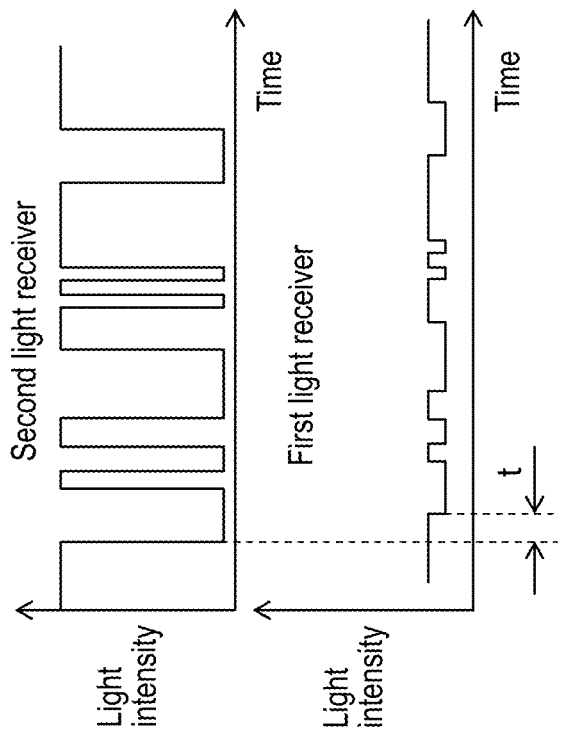
FIGS. 8A and 8B are schematic diagrams of distance measurement of a part of a projection surface by projection display apparatus 1.
Figure 8B:
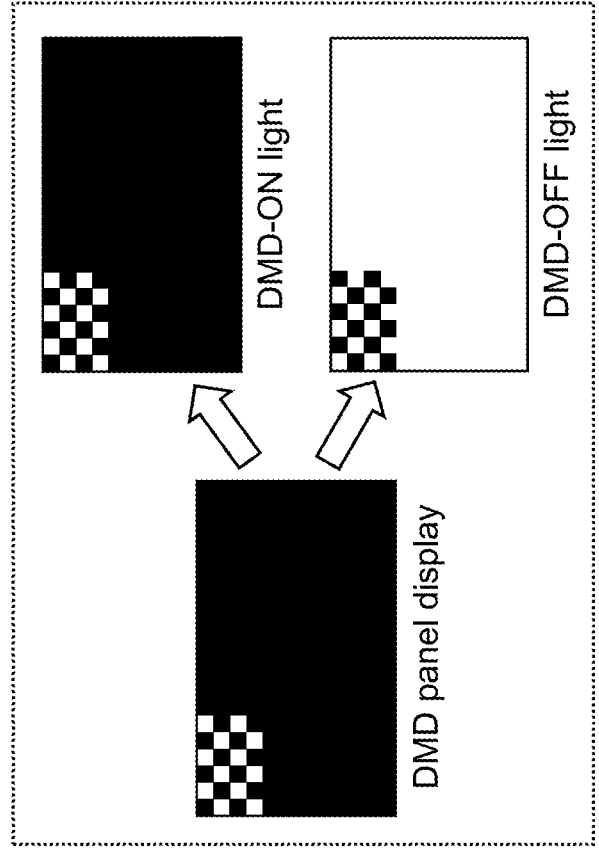

FIG. 8A shows a modified example of the first pattern image and the corresponding DMD-ON light and DMD-OFF light (see FIG. 6). FIG. 8B shows the waveforms of the DMD-ON light and DMD-OFF light of FIG. 8A that have been received by first and second light receivers 112 and 122, respectively (see FIGS. 7A to 7D).

The checker-board pattern in FIG. 8A is displayed only in a region of the panel of DMD 150. In this modified example, an area of higher brightness than the remaining area is localized in this region in the pattern of the pattern image. In such a pattern, most parts of the image projected as the DMD-ON light are displayed in black on projection surface 400. As a result, as shown in FIG. 8B, the intensity of light reflected by surface 400 and then striking first light receiver 112 decreases with increasing black display. The time delay of the light waveform is information about the distance to the position on surface 400 where the DMD-ON light has struck. Because the DMD-OFF light is the reverse of the DMD-ON light, the light intensity of second light receiver 122 increases.

As described so far, first light receiver 112 and second light receiver 122 differ in light intensity, and the light received by first light receiver 112 is the light reflected by the region of surface 400 where the checker-board pattern is projected. Thus, the phase difference in light intensity between first and second light receivers 112 and 122 and the angle-of-view data indicating the angle of view of projection optical system 300 are used by distance calculator 160 to calculate the distance to the target for distance measurement along the angle of view. This allows for distance measurement up to the part with the checker-board pattern. The angle-of-view data can be previously set in distance calculator 160.

Figure 9:
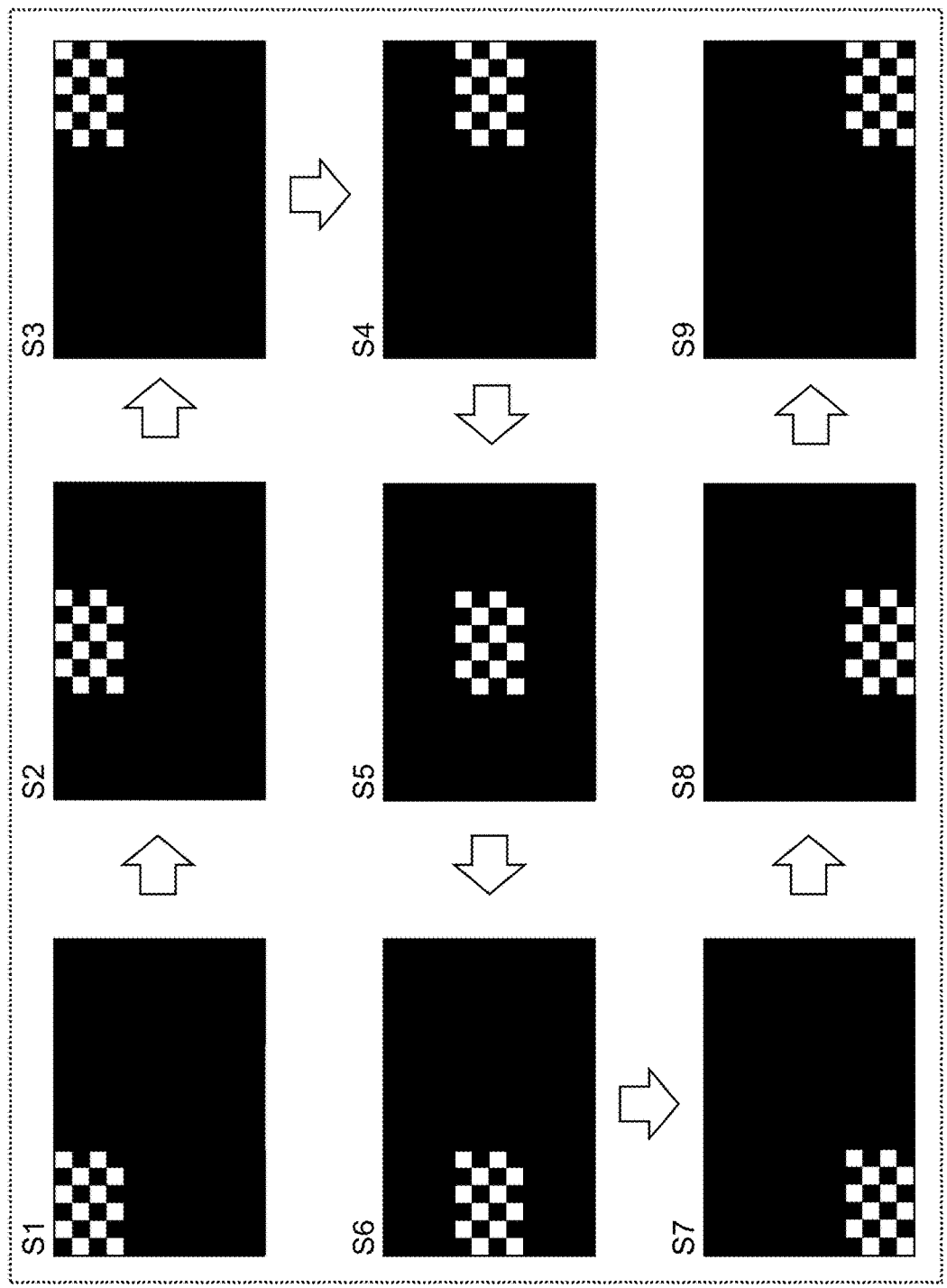
FIG. 9 is a schematic diagram of division and distance measurement of a projection surface by projection display apparatus 1.

FIG. 9 shows an example order of display on the panel of DMD 150 when projection surface 400 is divided into nine regions for distance measurement. As shown in FIG. 9, projection display apparatus 1 projects a pattern image in such a manner that the higher brightness area is moved from one region to another of the divided nine regions in the panel of DMD 150 (S1 to S9). Distance calculator 160 can perform distance measurement up to the higher brightness area as described above every time a pattern image is projected. Apparatus 1 repeats sequence S1-S9 in accordance with the image frame, thereby performing distance measurement for each of the divided nine regions in real time.

The distance measurement approach in the present exemplary embodiment is performed based on the pattern image projected onto projection surface 400. Hence, the distance measurement approach is applicable to the following conditions: when the optical zooming of projection optical system 300 is changed; when the optical system is replaced with another with a different focal length; and when a lens shift function is added. In other words, the angle-of-view data of projection optical system 300 can be entered to distance calculator 160 to perform the above-described distance measurement of a part of projection surface 400 without displacement of the projected image.

1-5. Application Examples

The above has described an example of the distance measurement approach performed by dividing the screen into nine regions. Projection display apparatus 1 can make DMD 150 change the division number, the method of division, and the like within the range of controllable resolution so as to achieve more flexible distance measurement and various corrections. An application example of the distance measurement approach in the present exemplary embodiment will now be described with reference to FIGS. 10A to 12D.

Figure 10B:
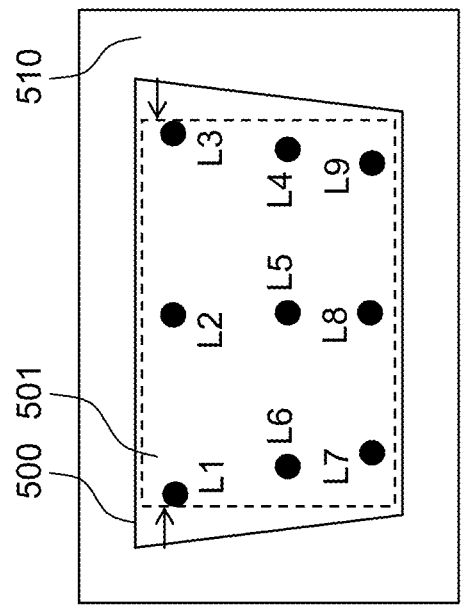
FIGS. 10A and 10B are schematic diagrams of a first application example of distance measurement results in projection display apparatus 1.
Figure 10A:
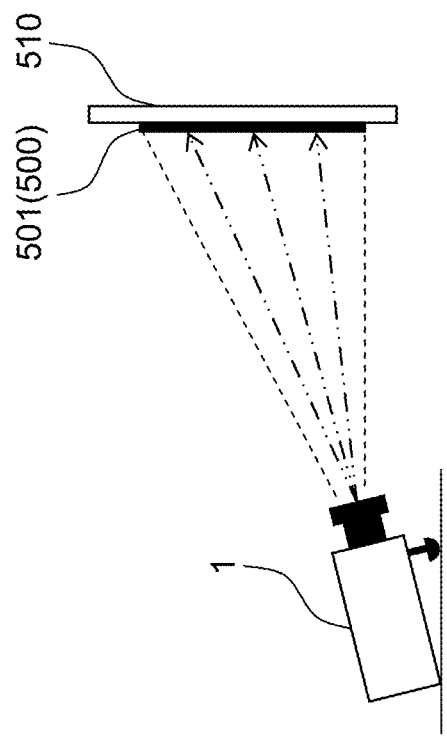

A first application example of a distance measurement result in projection display apparatus 1 will be described as follows with reference to FIGS. 10A and 10B. This example is an application to trapezoidal distortion correction. FIG. 10A shows a layout example of apparatus 1 in the case of trapezoidal distortion correction. FIG. 10B shows a display example of projection surface 510 in the example shown in FIG. 10A.

FIGS. 10A and 10B show an example of correcting the inclination of projection display apparatus 1 with respect to projection surface 510 based on the distance measurement results of the above-mentioned approach of dividing the screen into nine regions. When image is projected onto projection surface 510 with apparatus 1 inclined upward as shown in FIG. 10A, uncorrected projection image 500 is distorted and enlarged from bottom to top as the distance increases from apparatus 1 as shown in FIG. 10B. Apparatus 1 performs the distance measurement operation on the divided nine regions in the sequence of S1-S9 as described with FIG. 9, thereby obtaining a distance calculation result that indicates the information of lengths L1 to L9. Apparatus 1 calculates the distortion correction using the information on the lengths L1 to L9. This results in the formation of corrected projection image 501 as shown in FIG. 10B.

A second application example will be described as follows with reference to FIGS. 11A and 11B. This example is an application to the automatic shutdown of projection display apparatus 1. FIG. 11A shows a layout example of apparatus 1 at the time of automatic shutdown. FIG. 11B is a display example of projection image 503 in the example shown in FIG. 11A.

FIG. 11A shows an example including projection surface 510, which moves up and down like a roll-up screen, and curtain 520. As shown in FIG. 11A, when projection surface 510 is moved upward, the position of the image projected from projection display apparatus 1 is shifted along the distance from the position of projection image 502 (before shifted) on surface 510 to the position of projection image 503 (after shifted) on curtain 520. In this case, phase difference detector 130 detects the phase difference corresponding to a delay twice as long as that for the actual distance between image 502 (before shifted) and image 503 (after shifted). Consequently, distance calculator 160 calculates the different distance measurement values before and after the shift.

To achieve this, projection display apparatus 1 previously sets the distance to the position of projection surface 510 in, for example, the internal memory of controller 100. Furthermore, controller 100 is set in such a manner that when the distance measurement value exceeds a specified threshold value, projection surface 510 is determined to have been put away, and the image projection or the power of apparatus 1 is turned off as shown in FIG. 11B. This prevents the user from forgetting to turn off the power of apparatus 1.

A third application example will be described as follows with reference to FIGS. 12A to 12D. This example is an application to subject-tracking projection mapping. FIG. 12A is a layout example of projection display apparatus 1 in the case of subject-tracking projection mapping. FIG. 12B shows projection surface 510 and person 530, which are the subjects in the example shown in FIG. 12A. FIG. 12C shows an example of a distance measurement result in the case of FIG. 12B. FIG. 12D is a display example of subject-tracking projection mapping.

FIG. 12A shows a situation in which, projection image 504 is projected onto surface 510, and person 530 is performing some actions between projection display apparatus 1 and surface 510. In the application example to this projection mapping, apparatus 1 performs distance measurement by making the image division number for distance measurement larger than nine shown in FIG. 9, and also making the one-cycle frequency corresponding to the red to yellow regions, for example, a sixfold speed (360 fps).

As a result, projection display apparatus 1 can extract person position 540 as shown in FIG. 12C in the projected state shown in FIG. 12B. It is also possible to use a computer to separate an image to be projected onto surface 510 from an image to be projected onto person position 540 based on the image information, thereby displaying these images differently. This allows projecting a synthesized image as shown in FIG. 12D which appropriately tracks the performance of person 530.

1-6. Effects

As described so far, in the present exemplary embodiment, projection display apparatus 1 projects projection light to display an image onto projection surface 400. Apparatus 1 includes light source unit 20, DMD 150 as an example of the light deflector, first light receiver 112, second light receiver 122, and phase difference detector 130 and distance calculator 160 as examples of the calculator. Light source unit 20 emits light for producing the projection light. DMD 150 deflects, as DMD-ON light, at least part of the incident light coming from light source unit 20 to the first optical path L1 so as to produce the projection light. DMD 150 further deflects, as DMD-OFF light, the remaining part of the incident light to the second optical path L2, which is different from the first optical path L1. First light receiver 112 receives light that has traveled along the first optical path L1 and then has been reflected by projection surface 400. Second light receiver 122 receives light that has been deflected by DMD 150 and then has traveled along the second optical path L2. The calculator calculates the distance from apparatus 1 to projection surface 400 based on the light reception result obtained by first light receiver 112 and the light reception result obtained by second light receiver 122.

Projection display apparatus 1 described above facilitates measuring the distance to projection surface 400 by using the light that has traveled along the first optical path L1 and has been reflected by projection surface 400 and the light that has been deflected by DMD 150 and has traveled along the second optical path L2. Apparatus 1 can be implemented without greatly changing the configuration of the existing apparatus. Furthermore, apparatus 1 can perform distance measurement in each image frame, thereby achieving real-time distance measurement without affecting the image display.

In the present exemplary embodiment, light source unit 20 outputs light with a specified waveform which is used for distance measurement. Phase difference detector 130, which is an example of the calculator, detects the phase difference between the light with the specified waveform received by first light receiver 112 and the light with the specified waveform received by second light receiver 122. Distance calculator 160, which is an example of the calculator, calculates the distance based on the detection result obtained by phase difference detector 130. The specified waveform is a pulse waveform at irregular pulse intervals (see FIG. 5(e)).

Thus, projection display apparatus 1 allows light source unit 20 to emit light for distance measurement, thereby performing distance measurement.

In projection display apparatus 1, a one-frame period of the image contains a specified period to measure the distance (see FIG. 5(c) to (e)). Apparatus 1 projects, during the specified period, a first pattern image (FIG. 6(a)) and a second pattern image (FIG. 6(d)) reversed in brightness from the first pattern image. This effectively equalizes the brightness of the entire image between the first and second pattern images, preventing the viewers from feeling odd in the image display during the distance measurement operation.

Furthermore, in projection display apparatus 1, each of the first and second pattern images contains blue as an example of a specific single color. Apparatus 1 projects an image in yellow, which is complementary to the specific single color during the specified period (FIG. 5(c)). As a result, each pattern image and the image in the complementary color are combined to produce a white image, thereby further reducing the viewers from feeling odd in the image display.

Furthermore, in projection display apparatus 1, the first pattern image contains a pattern in which an area of higher brightness than the remaining area of the image is localized in a region of the pattern (see FIG. 8A). Distance calculator 160 as an example of the calculator calculates, based on the first pattern image, the distance from apparatus 1 to projection surface 400 at a position corresponding to the area of higher brightness. According to the distance measurement approach of the present exemplary embodiment, even if projection optical system 300 performs optical zooming, replacement of an optical unit, a lens shift, or other change operations, apparatus 1 can perform the distance measurement of a part of projection surface 400 without displacement of the projected image.

Furthermore, in projection display apparatus 1, the area of higher brightness is moved from one region to another in the first pattern image (FIG. 9). This allows performing the distance measurement of a part of projection surface 400 while scanning surface 400. According to the distance measurement approach in the present exemplary embodiment, the image pattern projected via light deflection controller 170 can be changed to measure the distance from apparatus 1 to an arbitrary position of an image displayed on projection surface 400.

In present exemplary embodiment, light source unit 20 emits a plurality of colors of light in a time division manner. The calculator calculates the distance based on light reception results obtained by first and second light receivers 112 and 122 when receivers 112 and 122 receive a specified color of light, used to calculate the distance, of the plurality of colors of light. As a result, distance measurement can be performed without being affected by light of colors other than the color specified to calculate the distance.

Furthermore, in the present exemplary embodiment, light source unit 20 includes LDs 201 and phosphor wheel 250. LDs 201 are examples of the light source for emitting the specified color of light. Phosphor wheel 250 is an example of the light wavelength converter for emitting other colors of light than the specified color based on the specified color from LDs 201.

In the present exemplary embodiment, projection display apparatus 1 further includes controller 100. Controller 100 controls, based on a distance calculation result obtained by the calculator, the following: the on-off operation of apparatus 1 and the position and shape of an image on projection surface 400 (see FIGS. 10A to 12D). The result of distance calculator 160 can be used to achieve image distortion correction, the turning off of the projection, and other various controls. The result can also be used for image control in subject-tracking projection mapping. For example, person position 540 can be extracted from an image on projection surface 510 so that an image to be projected onto surface 510 and an image to be projected onto person position 540 can be separated from each other, thereby projecting a synthesized image to be displayed differently.

Furthermore, in the present exemplary embodiment, light source unit 20 includes a plurality of LDs 201. Each LD 201 is an example of solid-state light source in light source unit 20. Projection display apparatus 1 can reduce deterioration in the accuracy of distance measurement due to variations in emission timing when the number of LDs 201 is increased.

Second Exemplary Embodiment

A second exemplary embodiment will now be described with reference to FIGS. 13 to 15B. The first exemplary embodiment has described the application examples in which the distance measurement results obtained in projection display apparatus 1 are used for image distortion correction and other operations. The second exemplary embodiment will now describe projection display apparatus 1A, which controls projection optical system 300 based on distance measurement results.

In the following description, the same configuration and operation as those of projection display apparatus 1 of the first exemplary embodiment may be sometimes omitted. Thus, the following description will be focused on features unique to projection display apparatus 1A according to the present exemplary embodiment.

Figure 13:
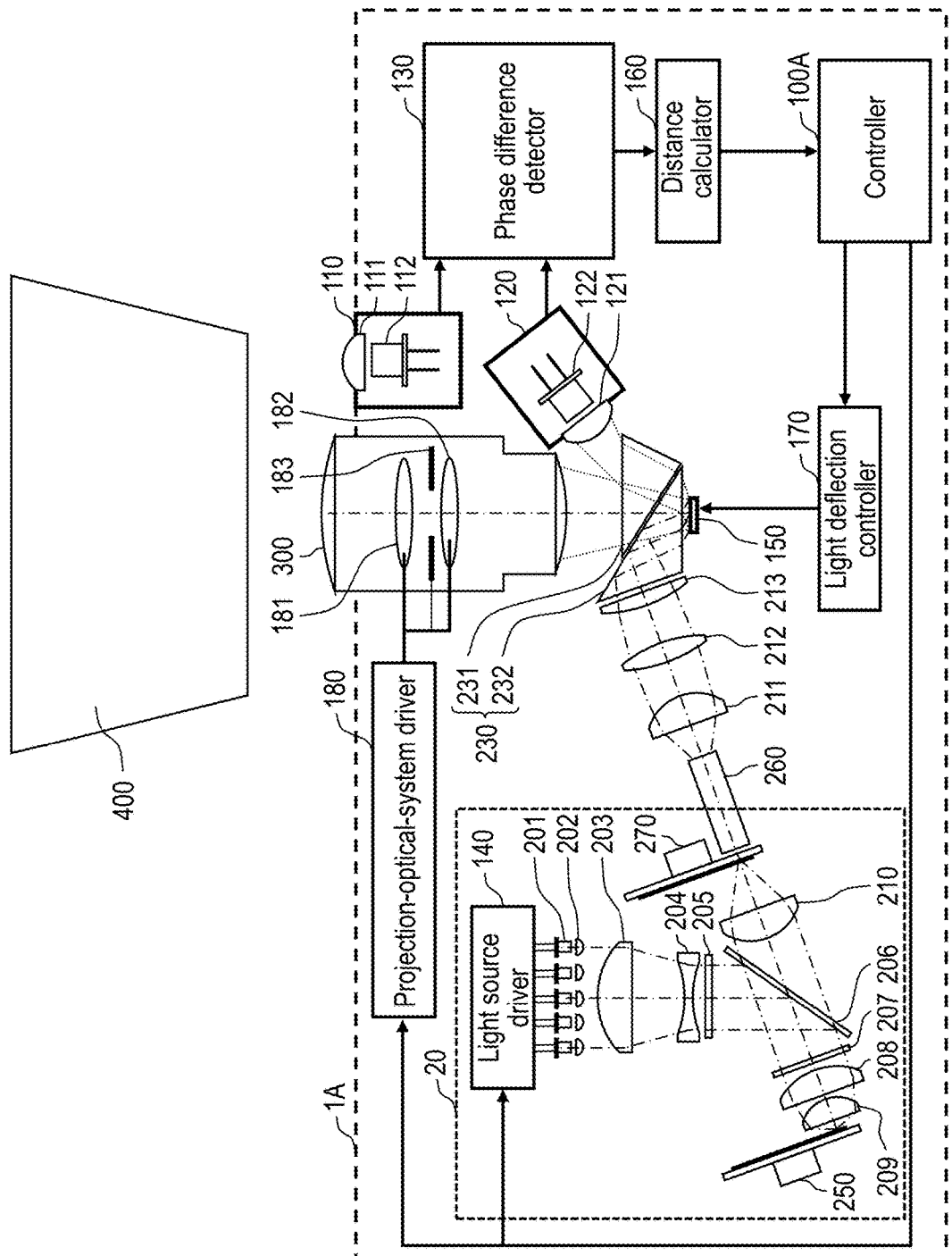
FIG. 13 is an example configuration of projection display apparatus 1A according to a second exemplary embodiment.

FIG. 13 is a schematic configuration of projection display apparatus 1A of the second exemplary embodiment. Apparatus 1A has a similar configuration to that of apparatus 1 (FIG. 1) of the first exemplary embodiment. Apparatus 1A includes controller 100A, which causes projection-optical-system driver 180 to adjust each unit of projection optical system 300 based on the calculation result obtained by distance calculator 160. FIG. 13 shows projection optical system 300 composed of zoom lens 181, focus lens 182, and iris diaphragm 183.

Projection-optical-system driver 180 includes various drive circuits for driving the units of projection optical system 300. To be more specific, projection-optical-system driver 180 includes a zoom drive circuit for driving zoom lens 181, thereby changing the zoom position of system 300; a focus drive circuit for driving focus lens 182, thereby changing the focal position of system 300, and an iris diaphragm drive circuit for driving iris diaphragm 183, thereby changing the iris diaphragm position of system 300.

Projection-optical-system driver 180 further includes a motor connected to each unit of projection optical system 300. Driver 180 may be partly or entirely incorporated in system 300. Furthermore, driver 180 may include internal memory, such as flash memory which stores information unique to system 300.

Controller 100A of projection display apparatus 1A controls projection-optical-system driver 180 based on the distance measurement result calculated by distance calculator 160, thereby performing various optical corrections in system 300, such as adjusting the focus, changing the optical zoom magnification, and adjusting the depth of focus.

Figure 14A:
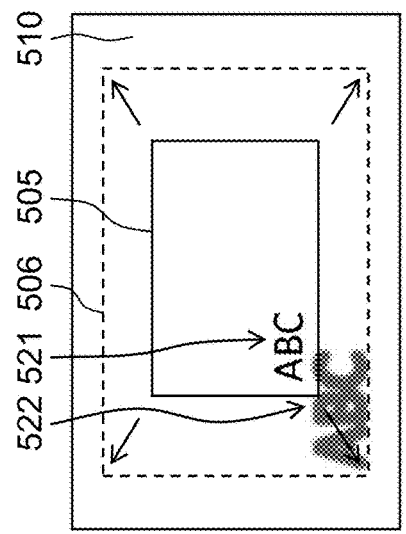
FIGS. 14A to 14C are schematic diagrams of an example of focus correction in projection display apparatus 1A.
Figure 14B:
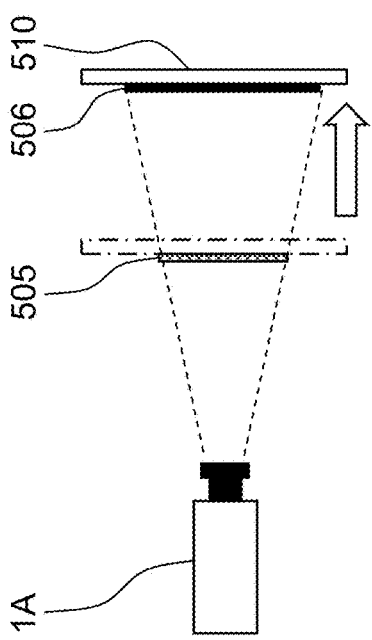
Figure 14C:
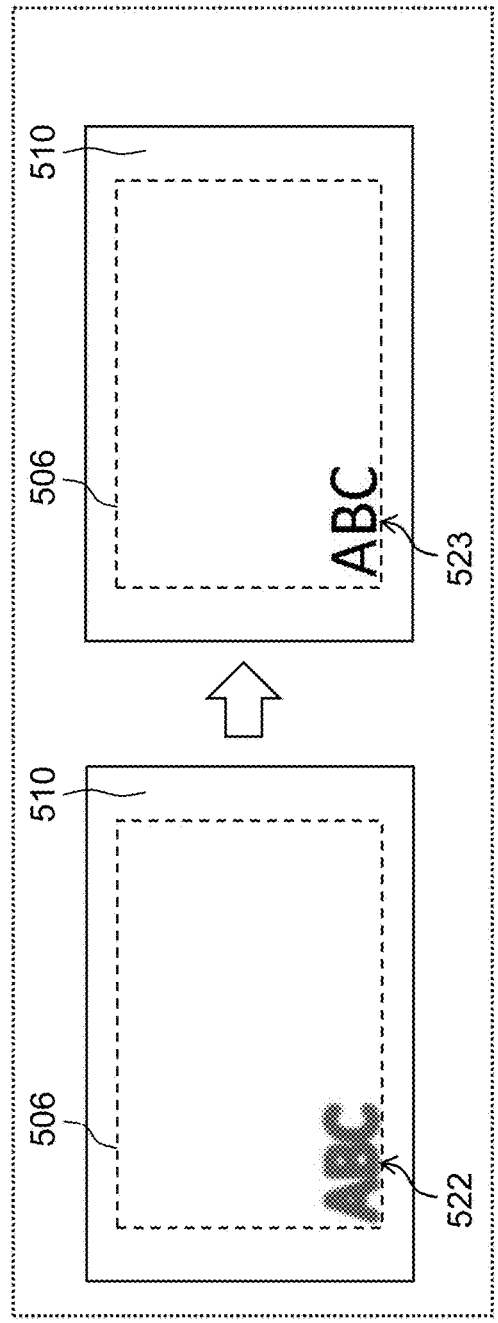

An example of focus correction in projection display apparatus 1A will be described as follows with reference to FIGS. 14A to 14C. FIG. 14A shows an example of projection surface 510 being moved with respect to apparatus 1A. FIG. 14B shows the projected image being changed in the example shown in FIG. 14A. FIG. 14C shows display examples before and after focus correction on the moved projection surface 510.

FIGS. 14A to 14C show an example of focus correction in which the focus is kept adjusted when projection surface 510 is moved toward or away from projection display apparatus 1A. In the present exemplary embodiment, the internal memory of controller 100A or projection-optical-system driver 180 (FIG. 13) previously stores information about the drive position of focus lens 182 depending on the distance between apparatus 1A and projection surface 510.

FIG. 14A shows an example in which projection surface 510 is shifted away from projection display apparatus 1A. In this example, the size of the image on surface 510 is enlarged from projection image 505 (before shifted) to projection image 506 (after shifted) as shown in FIG. 14B. If the point of focus were not shifted, display letter 521 or "ABC" in focus on image 505 (before shifted) would become blurred display letter 522 on image 506 (after shifted) due to the magnification of the display size.

To avoid this happening, distance calculator 160 calculates the distance information between image 505 (before shifted) and image 506 (after shifted). Controller 100A makes focus lens 182 perform focus correction in conformity with the shifted distance based on the distance information calculated by distance calculator 160 and the pre-stored information about the drive position. As a result, blurred display letter 522 can be brought into focus like display letter 523 on image 506 (after shifted) as shown in FIG. 14C.

An example of optical zooming in projection display apparatus 1A will be described as follows with reference to FIGS. 15A and 15B. FIG. 15A shows the projected image being changed in the same manner as in FIG. 14B. FIG. 15B shows display examples on projection surface 510 (after shifted) before and after the optical zooming.

FIGS. 15A and 15B show an example in which not only the point of focus is adjusted as shown in FIGS. 14A to 14C, but also optical zooming is performed so that the images projected on surface 510 can be equal in size before and after the optical zooming. When surface 510 is moved away from projection display apparatus 1A as shown in FIG. 14A, the image is enlarged from image 505 (before shifted) to image 506 (after shifted) as shown in FIG. 15A.

In this example, controller 100A of projection display apparatus 1A causes projection-optical-system driver 180 to drive not only focus lens 182 as describe above, but also zoom lens 181 based on the distance information from distance calculator 160. This allows projection image 507 (after shifted) and projection image 505 (before shifted) to have an equal size and to be in focus as shown by display letter 524 on surface 510 in FIG. 15B.

Furthermore, projection display apparatus 1A allows iris diaphragm 183 to control the depth of focus. For example, the internal memory of controller 100A or projection-optical-system driver 180 can previously store information for driving iris diaphragm 183. While referring to the information for driving iris diaphragm 183, controller 100A causes projection-optical-system driver 180 to open and close iris diaphragm 183. As a result, even when the zoom position is changed, the range in which projection surface 510 is in focus (i.e., the depth of focus) can be kept constant.

As described so far, projection display apparatus 1A allows controller 100A to control at least one of the following: the focal position, the zoom position, and the iris diaphragm position of apparatus 1A based on the distance calculation result. Apparatus 1A can utilize the distance measurement result for various controls, such as the control of projection optical system 300 described above.

Third Exemplary Embodiment

A third exemplary embodiment will now be described with reference to FIGS. 16 to 18. In the first exemplary embodiment, the single DMD 150 produces the plurality of colors of light in the time division manner. In the third exemplary embodiment, projection display apparatus 1B includes DMDs 150R to 150B corresponding to the colors.

Projection display apparatus 1B of the present exemplary embodiment will be described as follows. In the following description, the same configuration and operation as those of projection display apparatuses 1 and 1A of the first and second exemplary embodiments may be sometimes omitted.

The configuration of projection display apparatus 1B will now be described with reference to FIGS. 16 and 17. FIG. 16(a) is a plan view of an example configuration of apparatus 1B. FIG. 16(b) is a side view of projection optical system 300 and its vicinity shown in FIG. 16(a). In FIG. 16, the controller and other devices included in apparatus 1B are not illustrated.

Figure 16:
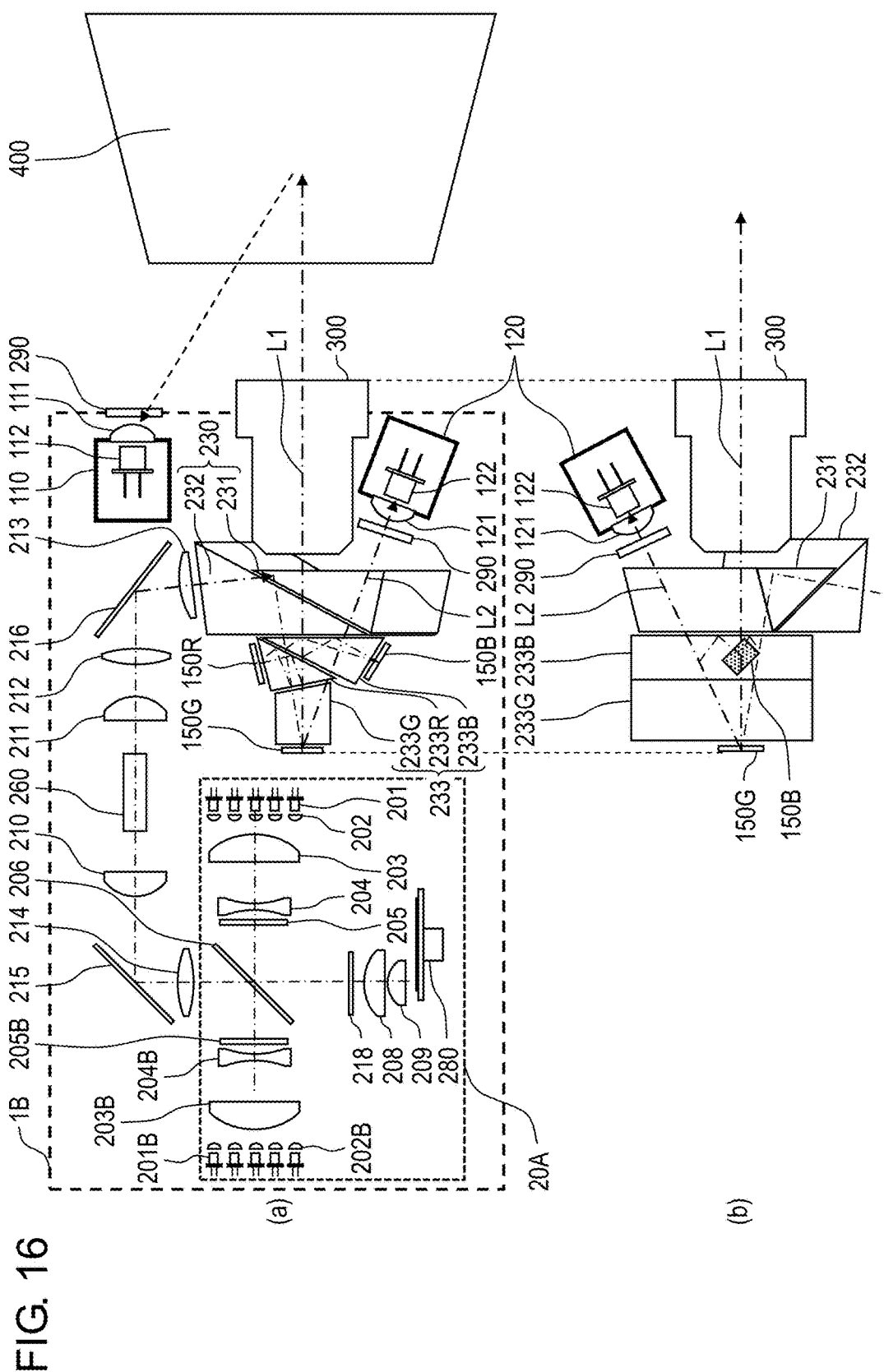
FIG. 16 shows an example configuration of projection display apparatus 1B according to a third exemplary embodiment.

As shown in FIG. 16, projection display apparatus 1B is similar in configuration to projection display apparatus 1 of the first exemplary embodiment, but includes DMDs 150R, 150G, and 150B as an example of the light deflector instead of a single DMD 150 and color separation wheel 270 of apparatus 1. DMDs 150R, 150G, and 150B, which correspond to the red, green, and blue, respectively, of the three primary colors, are driven by a light deflection controller (not shown).

Projection display apparatus 1B further includes light source unit 20A, which includes the same devices (LDs 201, lenses 202, 203, 204, diffuser 205) as those in light source unit 20 of the first exemplary embodiment (FIG. 1). Light source unit 20A further includes devices for the blue region (LDs 201B, a plurality of lenses 202B, lens 203B, lens 204B, diffuser 205B), which are separate from the devices for the red and green regions.

To be more specific, light source unit 20A further includes a plurality of blue LDs 201B, lenses 202B, 203B, and 204B, and diffuser 205B. These devices 201B to 205B for the blue region may have the same configuration as devices 201 to 205 to excite phosphors for the red and green regions. For example, LDs 201B are arranged in such a manner that the light outgoing from it is s-polarized with respect to the incident surface of dichroic mirror 206. LDs 201B are an example of the solid-state light source.

The present exemplary embodiment describes an example in which LDs 201B for the blue region are used for distance measurement. The blue light emitted by LDs 201B for the blue region passes through lenses 202B, 203B, and 204B and strikes diffuser 205B. After passing through diffuser 205B, the light strikes dichroic mirror 206. The light from LDs 201 and the light from 201B are reflected by dichroic mirror 206.

Light source unit 20A of the present exemplary embodiment includes half-wave plate 218 and phosphor wheel 280 instead of quarter-wave plate 207 and phosphor wheel 250 (FIG. 1) included in the first exemplary embodiment. Projection display apparatus 1B further includes lens 214 and reflection mirrors 215 and 216. The blue light from LDs 201 for exciting phosphors is reflected by dichroic mirror 206 and strikes half-wave plate 218.

Half wave plate 218 is a retarder with a phase difference of a half wavelength near the central wavelength of emission of LDs 201. After passing through half-wave plate 218, the s-polarized light is converted into p-polarized light and strikes condenser lenses 208 and 209. Condenser lens 209 forms a focal spot, on which the incoming light is focused, near phosphor wheel 280 of the present exemplary embodiment.

The configuration of phosphor wheel 280 will now be described with reference to FIG. 17. FIG. 17(a) is a front view of phosphor wheel 280 seen from the incident surface. FIG. 17(b) is a side view of phosphor wheel 280, which is a lateral view of FIG. 17(a).

Similar to phosphor wheel 250 (FIG. 3) of the first exemplary embodiment, phosphor wheel 280 of the present exemplary embodiment includes aluminum substrate 281 and drive motor 283 for rotating aluminum substrate 281 about central axis 280X. In phosphor wheel 250 of the first exemplary embodiment, phosphor layer 252 is a substantially ring shaped with a gap. In contrast, phosphor wheel 280 of the present exemplary embodiment includes complete ring-shaped phosphor layer 282 on aluminum substrate 281 as shown in FIG. 17(a). This allows the focal spot to remain on phosphor layer 282 during the rotation of phosphor wheel 280.

When excited at the focal spot, phosphor layer 282 emits fluorescence, and as a result, the light with green and red components is emitted as natural light from phosphor wheel 280. Meanwhile, of the blue light incident on phosphor layer 282, the light that has not been phosphor-converted is reflected by the reflective coating on aluminum substrate 281 and is emitted from phosphor wheel 280 with its phase inverted. Phosphor wheel 280 is an example of the light wavelength converter.

Referring back to FIG. 16, the light from phosphor wheel 280 passes through condenser lenses 208 and 209, and strikes half-wave plate 218. Of the light incident on half-wave plate 218, the light with green and red components obtained by phosphor conversion passes through dichroic mirror 206 and travels toward lens 214. In contrast, the blue light, which has not been phosphor-converted, is again converted into s-polarized light by half-wave plate 218 and is reflected by dichroic mirror 206, instead of traveling toward lens 214.

Meanwhile, the light from LDs 201B for the blue region passes through lenses 202B, 203B, and 204B and diffuser 205B, then is reflected by dichroic mirror 206, and travels toward lens 214.

As described so far, the light in the green and red regions coming from phosphor layer 282 and the light in the blue region coming from LDs 201B are emitted from light source unit 20A through dichroic mirror 206. These colored light rays are superimposed and emitted so as to be perceived as white light.

The light from light source unit 20A passes through lens 214, reflection mirror 215, and condenser lens 210, and is collected on rod integrator 260. After being emitted from rod integrator 260, the light passes through lenses 211 and 212, is reflected by reflection mirror 216 to pass through lens 213, and strikes TIR prism 230.

Projection display apparatus 1B further includes color prism 233, and two optical filters 290. After passing through lens 213 and striking prism 232, the light is totally reflected by the air layer of TIR prism 230 and strikes color prism 233.

Color prism 233 is composed of three prisms 233G, 233R, and 233B. One of their interfaces is provided with a blue-reflecting dichroic mirror (not shown) and the other interface is provided with a red-reflecting dichroic mirror (not shown). These dichroic mirrors direct the blue light ray into prism 233B, the red light ray into prism 233R, and the green light ray into prism 233G. Thus, color prism 233 allows these color rays to substantially form an image on the respective DMDs 150R, 150G, and 150B.

DMD 150B for the blue region, DMD 150R for the red region, and DMD 150G for the green region can have the same configuration as DMD 150 of the first exemplary embodiment. Each of DMDs 150R, 150G, and 150B deflects DMD-ON light to the first optical path L1 and DMD-OFF light to the second optical path L2.

Two optical filters 290 can be located, for example, beside condenser lenses 111 and 121 of first and second light receivers 112 and 122. Of the DMD-ON light that has reached projection surface 400, part of the light reflected by surface 400 strikes one of optical filters 290. In contrast, the DMD-OFF light from DMDs 150B, 150R, and 150G travels along the second optical path L2 and strikes the other optical filter 290.

Optical filters 290 transmit only the blue wavelength component of the incident light, and block the remaining wavelength components. Optical filters 290 allow first and second light receivers 112 and 122 to receive blue light only so as to reduce optical noise in these receivers 112 and 122.

The operation of projection display apparatus 1B will now be described with reference to FIG. 18. FIG. 18(a) shows a one-frame image projected by apparatus 1B. FIGS. 18(b), (c), and (d) show the timings to drive DMDs 150B, 150R, and 150G for the red, green, and blue images contained in the one-frame image. FIG. 18(e) shows the timing to drive LDs 201B for the blue image.

In the first exemplary embodiment, the single DMD 150 is used to combine the colors of light in a time division manner to generate white light. Meanwhile, in the third exemplary embodiment, DMDs 150R, 150G, and 150B for light in the red, green, and blue regions, respectively, are used combine the colors of light to produce white light without time division.

To be more specific, the one-frame image shown in FIG. 18(a) is synthesized by driving DMDs 150R, 150G, and 150B in such a manner as to produce the red, green, and blue images simultaneously as shown in FIGS. 18(b), (c), and (d).

In the present exemplary embodiment, LDs 201B for the blue region are driven by the light source driver (not shown) and produce pulsed light for distance measurement (FIG. 18(e)). LDs 201B are under control of the light deflection controller (not shown) and operate with DMD 150B for the blue region. For example, projection display apparatus 1B pulse-drives LDs 201B in a specified period while the blue image is displayed (e.g., about 20 microseconds) as shown in FIGS. 18(d) and (e). In the specified period, the pulsed light is emitted for about 3 microseconds in total.

Furthermore, projection display apparatus 1B controls DMDs 150R, 150G, and 150B in such a manner that the on-off timing can be staggered between each pixel and between each color during the production of each color image as shown in FIGS. 18(b), (c), and (d). This is because the intensity of the light perceived in a certain position on projection surface 400 during the production of each color image depends on the on-off time ratio of DMDs 150R, 150G, and 150B concerning the corresponding pixel. For example, if the light intensity of each color is displayed in gradation, DMDs 150R, 150G, and, 150B have an equal on-off time ratio in each gradation. If the gradation display of each color is performed at the same timing, noise may be perceived due to image lag and other adverse effects.

To avoid this, when the colors have an equal gradation, an image can be displayed while intentionally staggering the on-off timings within the range of the equal total time ratio, thereby reducing the noise. Thus, each timing of DMDs 150R, 150G, and 150B can be separately controlled so that when LDs 201B produce pulsed light for distance measurement, noise in images is less likely to be perceived.

The pulsed light thus produced is eventually received by first light receiver 112 and second light receiver 122. Light source unit 20A of the present exemplary embodiment does not employ time division to emit light in the red, green, and blue regions. Instead, unit 20A emits the light in the red and green regions by superimposing it on the blue pulsed light emitted from LDs 201B. The light in the red and green regions is on-off controlled by DMDs 150R and 150G separately as describe above. Consequently, if the timing coincided with that of the blue pulsed light in the on-off control, light receivers 112 and 122 might cause noise.

To avoid this happening, the present exemplary embodiment includes optical filters 290 located in front of first light receiver 112 and second light receiver 122 so as to transmit the blue light only, thereby reducing the noise effects. Furthermore, the blue excitation light from LDs 201 to excite phosphors is made to return to diffuser 205 by dichroic mirror 206. This configuration prevents the blue excitation light from being mixed in the pulsed light, and hence from causing noise in light receivers 112 and 122.

Thus, in projection display apparatus 1B, light source unit 20A emits a plurality of colors of light simultaneously. Apparatus 1B includes optical filters 290 for first and second light receivers 112 and 122 so that a specified color of light of the plurality of colors of light can be transmitted for distance calculation and the remaining colors of light can be blocked. This reduces the noise influence due to the colors of light other than the specified color of light on distance measurement.

In the description so far, pulsed light is produced using LDs 201B for the blue region. Alternatively, the pulsed light for distance measurement may be produced by using LDs 201 to excite phosphors, and the pulsed light emitted by the phosphors may be used for distance measurement. However, if high-speed pulsed light is required in consideration of decay characteristics as a physical property of phosphors, it is preferable to produce pulsed light by using LDs 201B for the blue region.

Other Exemplary Embodiments

The first to third exemplary embodiments have been described as examples of the technique of the present application. However, the technique of the present disclosure is not limited to these examples and can be applied to other embodiments obtained by modification, replacement, addition, omission, etc. Furthermore, the components described in each of the above embodiments may be combined to form additional embodiments. Examples of such additional embodiments will now be described.

In the first to third exemplary embodiments, the light source unit combines the light from the blue LDs with the light from the yellow phosphor so as to produce white light. However, the configuration of the light source unit in the present disclosure is not limited to this; for example, it is possible to use a light source unit that can produce white light by combining different colors of light. For example, the light source unit may include red and green LDs instead of the yellow phosphor to produce white light. This light source unit can produce pulsed light more easily than using a phosphor, so that green light or red light can be used instead of blue light to produce pulsed light.

In each of the above exemplary embodiments, DMDs are used as an example of the light deflector. However, the light deflector in the present disclosure is not limited to DMDs and can include a scanning micro electro mechanical system (MEMS) device and a chopper mirror. For example, when a MEMS device including at least one mirror scans projection light to draw an image, the chopper mirror, which is one of the at least one mirror, can control the amount of the projection light by deflecting the light to the first or second optical path. The concept of the present disclosure is applicable to this configuration.

These exemplary embodiments have been described in detail as examples of the technique of the present disclosure with reference to accompanying drawings.

Note that some of the components shown in the accompanying drawings and described in detail are not essential to solve the above-mentioned problems but are given only to exemplify the technique of the present disclosure. Therefore, these components should not be regarded as essential just because they are shown in the accompanying drawings and described in detail.

Furthermore, the above embodiments are examples of the technique of the present disclosure, and can be subject to modification, replacement, addition, omission, etc. within the scope of claims and their equivalents.

INDUSTRIAL APPLICABILITY

The present disclosure is applicable to a projection display apparatus that projects projection light for image display onto any of various kinds of projection surface.

What is claimed is:
1. A projection display apparatus for projecting projection light to display an image onto a projection surface, the projection display apparatus comprising:
a light source unit configured to emit light for producing the projection light;
a light deflector configured
to deflect at least part of incident light coming from the light source unit to a first optical path so as to produce the projection light and
to deflect a remaining part of the incident light to a second optical path different from the first optical path;
a first light receiver configured to receive the at least part of the incident light that has traveled along the first optical path and then has been reflected by the projection surface;
a second light receiver configured to receive the remaining part of the incident light that has traveled along the second optical path from the light deflector; and
a calculator configured to calculate a distance from the projection display apparatus to the projection surface based on a light reception result obtained by the first light receiver receiving the at least part of the incident light and a light reception result obtained by the second light receiver receiving the remaining part of the incident light;
wherein:
the light source unit outputs the light with a specified waveform, and the calculator calculates the distance based on a phase difference between the light with the specified waveform received by the first light receiver and the light with the specified waveform received by the second light receiver.

2. The projection display apparatus according to claim 1, wherein the specified waveform is a pulse waveform at irregular pulse intervals.

3. The projection display apparatus according to claim 1, wherein
a one-frame period of the image contains a specified period to measure the distance, and
the projection display apparatus projects, during the specified period,
a first pattern image and
a second pattern image reversed in brightness from the first pattern image.

4. The projection display apparatus according to claim 3, wherein
each of the first pattern image and the second pattern image contains a specific single color and
the projection display apparatus projects an image in a color complementary to the specific single color during the specified period.

5. The projection display apparatus according to claim 3, wherein
the first pattern image contains a pattern in which an area of higher brightness than a brightness of a remaining area is localized, and
the calculator calculates, based on the first pattern image, the distance from the projection display apparatus to the projection surface at a position corresponding to the area of higher brightness.

6. The projection display apparatus according to claim 5, wherein the area of higher brightness is moved in the first pattern image.

7. The projection display apparatus according to claim 1, wherein
the light source unit emits a plurality of colors of light simultaneously, and
the projection display apparatus further comprises an optical filter in each of the first light receiver and the second light receiver, the optical filter being configured
to transmit a specified color of light used to calculate the distance and
to block all colors of light of the plurality of colors of light except the specified color of light.

8. The projection display apparatus according to claim 7, wherein the light source unit comprises:
a light source configured to emit the specified color of light; and
a light wavelength converter configured to emit a color of light other than the specified color of light based on the specified color of light.

9. The projection display apparatus according to claim 1, further comprising:
a controller configured to control, based on a result obtained by the calculator calculating the distance, at least one of an on-off operation, a focal position, a zoom position and an iris diaphragm position of the projection display apparatus, and a position and a shape of the image on the projection surface.

10. The projection display apparatus according to claim 1, wherein the light deflector comprises at least one digital micromirror device.

11. The projection display apparatus according to claim 1, wherein the light source unit comprises a plurality of solid-state light sources.

12. A projection display apparatus for projecting projection light to display an image onto a projection surface, the projection display apparatus comprising:
a light source unit configured to emit light for producing the projection light;
a light deflector configured
to deflect at least part of incident light coming from the light source unit to a first optical path so as to produce the projection light and
to deflect a remaining part of the incident light to a second optical path different from the first optical path;
a first light receiver configured to receive the at least part of the incident light that has traveled along the first optical path and then has been reflected by the projection surface;
a second light receiver configured to receive the remaining part of the incident light that has traveled along the second optical path from the light deflector; and
a calculator configured to calculate a distance from the projection display apparatus to the projection surface based on a light reception result obtained by the first light receiver receiving the at least part of the incident light and a light reception result obtained by the second light receiver receiving the remaining part of the incident light,
wherein
a one-frame period of the image contains a specified period to measure the distance, and
the projection display apparatus projects, during the specified period,
a first pattern image and
a second pattern image reversed in brightness from the first pattern image.

13. The projection display apparatus according to claim 12, wherein
each of the first pattern image and the second pattern image contains a specific single color and
the projection display apparatus projects an image in a color complementary to the specific single color during the specified period.

14. The projection display apparatus according to claim 12, wherein
the first pattern image contains a pattern in which an area of higher brightness than a brightness of a remaining area is localized, and
the calculator calculates, based on the first pattern image, the distance from the projection display apparatus to the projection surface at a position corresponding to the area of higher brightness.

15. The projection display apparatus according to claim 14, wherein the area of higher brightness is moved in the first pattern image.

16. A projection display apparatus for projecting projection light to display an image onto a projection surface, the projection display apparatus comprising:
a light source unit configured to emit light for producing the projection light;
a light deflector configured
to deflect at least part of incident light coming from the light source unit to a first optical path so as to produce the projection light and to deflect a remaining part of the incident light to a second optical path different from the first optical path;

a first light receiver configured to receive the at least part of the incident light that has traveled along the first optical path and then has been reflected by the projection surface;

a second light receiver configured to receive the remaining part of the incident light that has traveled along the second optical path from the light deflector; and a calculator configured to calculate a distance from the projection display apparatus to the projection surface based on a light reception result obtained by the first light receiver receiving the at least part of the incident light and a light reception result obtained by the second light receiver receiving the remaining part of the incident light, wherein:

the light source unit emits a plurality of colors of light simultaneously, and the projection display apparatus further comprises an optical filter in each of the first light receiver and the second light receiver, the optical filter being configured to transmit a specified color of light used to calculate the distance and to block all colors of light of the plurality of colors of light except the specified color of light.

17. The projection display apparatus according to claim 16, wherein the light source unit comprises:

a light source configured to emit the specified color of light; and a light wavelength converter configured to emit a color of light other than the specified color of light based on the specified color of light.

* * * * *